(12) United States Patent
Ota et al.

(10) Patent No.: US 8,832,428 B2
(45) Date of Patent: Sep. 9, 2014

(54) SYSTEM AND METHOD FOR SECURELY COMMUNICATING ACROSS MULTIPLE NETWORKS USING A SINGLE RADIO

(75) Inventors: Nathan Ota, San Francisco, CA (US); Robert Conant, Burlingame, CA (US); Michel Veillette, Waterloo (CA); Vincent Bemmel, Dublin, CA (US); Frederick Enns, Menlo Park, CA (US)

(73) Assignee: Trilliant Holdings Inc., Redwood City, CA (US)

( * ) Notice: Subject to any disclaimer, the term of this patent is extended or adjusted under 35 U.S.C. 154(b) by 356 days.

(21) Appl. No.: 13/296,552

(22) Filed: Nov. 15, 2011

(65) Prior Publication Data

US 2012/0124367 A1 May 17, 2012

Related U.S. Application Data

(60) Provisional application No. 61/413,538, filed on Nov. 15, 2010, provisional application No. 61/441,375, filed on Feb. 10, 2011.

(51) Int. Cl.
*H04L 29/06* (2006.01)
*H04W 12/04* (2009.01)
*H04W 84/10* (2009.01)
*H04W 88/06* (2009.01)
*H04W 12/06* (2009.01)

(52) U.S. Cl.
CPC .............. *H04W 12/04* (2013.01); *H04W 84/10* (2013.01); *H04L 63/0846* (2013.01); *H04W 88/06* (2013.01); *H04W 12/06* (2013.01)
USPC ....................................................... 713/153

(58) Field of Classification Search
CPC .... H04L 67/12; H04L 63/0846; H04W 8/068
USPC ......................................................... 713/153
See application file for complete search history.

(56) References Cited

U.S. PATENT DOCUMENTS

| 4,132,981 A | 1/1979 | White ............................ 340/203 |
| 4,190,800 A | 2/1980 | Kelly, Jr. et al. ................. 325/37 |

(Continued)

FOREIGN PATENT DOCUMENTS

| EP | 0 578 041 B1 | 11/1999 | .............. H04L 12/56 |
| EP | 0 663 746 B1 | 1/2003 | .............. H04L 12/46 |

(Continued)

OTHER PUBLICATIONS

Hydro One Networks, Inc., Request for Proposal for Smart Metering Services, 16 pp., Mar. 4, 2005.

(Continued)

*Primary Examiner* — Peter Shaw
*Assistant Examiner* — Ali Shayanfar
(74) *Attorney, Agent, or Firm* — Moser Taboada

(57) ABSTRACT

A communications module for facilitating secure communications on a first network and a second network includes: a single transceiver for receiving and transmitting first network messages from and to the first network and at least transmitting second network messages to the second network; at least a first processor connected to the single transceiver for processing one or more first network messages and second network messages; the at least a first processor including first network logic for processing first network messages and second network logic for processing second network messages; and the second network logic including instructions for securing second network messages such that decryption of the second network messages is limited to a particular receiving device on the second network. The second network messages may include commodity pricing and use information.

21 Claims, 16 Drawing Sheets

(56) References Cited

U.S. PATENT DOCUMENTS

| | | | |
|---|---|---|---|
| 4,204,195 A | 5/1980 | Bogacki | 340/151 |
| 4,254,472 A | 3/1981 | Juengel et al. | 364/900 |
| 4,322,842 A | 3/1982 | Martinez | 370/11 |
| 4,396,915 A | 8/1983 | Farnsworth et al. | 340/870.03 |
| 4,425,628 A | 1/1984 | Bedard et al. | 364/900 |
| 4,638,314 A | 1/1987 | Keller | 340/870.02 |
| 4,644,320 A | 2/1987 | Carr et al. | 340/12.37 |
| 4,749,992 A | 6/1988 | Fitzmeyer et al. | 340/870.02 |
| 4,792,946 A | 12/1988 | Mayo | 370/245 |
| 4,939,726 A | 7/1990 | Flammer et al. | 370/400 |
| 5,007,052 A | 4/1991 | Flammer | 370/389 |
| 5,056,107 A | 10/1991 | Johnson et al. | 375/138 |
| 5,077,753 A | 12/1991 | Grau, Jr. et al. | 375/141 |
| 5,079,768 A | 1/1992 | Flammer | 370/349 |
| 5,115,433 A | 5/1992 | Baran et al. | 370/400 |
| 5,117,422 A | 5/1992 | Hauptschein et al. | 370/255 |
| 5,130,987 A | 7/1992 | Flammer | 370/436 |
| 5,138,615 A | 8/1992 | Lamport et al. | 370/94.3 |
| 5,159,592 A | 10/1992 | Perkins | 370/338 |
| 5,216,623 A | 6/1993 | Barrett et al. | 364/550 |
| 5,276,680 A | 1/1994 | Messenger | 370/311 |
| 5,311,581 A | 5/1994 | Merriam et al. | 379/106.07 |
| 5,400,338 A | 3/1995 | Flammer, III et al. | 370/255 |
| 5,430,729 A | 7/1995 | Rahnema | 370/409 |
| 5,432,507 A | 7/1995 | Mussino et al. | 340/870.03 |
| 5,453,977 A | 9/1995 | Flammer, III et al. | 370/254 |
| 5,459,727 A | 10/1995 | Vannucci | 370/332 |
| 5,463,777 A | 10/1995 | Bialkowski et al. | 1/1 |
| 5,465,398 A | 11/1995 | Flammer | 455/69 |
| 5,467,345 A | 11/1995 | Cutter, Jr. et al. | 370/229 |
| 5,471,469 A | 11/1995 | Flammer, III et al. | 370/346 |
| 5,479,400 A | 12/1995 | Dilworth et al. | 370/331 |
| 5,488,608 A | 1/1996 | Flammer, III | 370/400 |
| 5,515,369 A | 5/1996 | Flammer, III et al. | 370/480 |
| 5,515,509 A | 5/1996 | Rom | 709/228 |
| 5,528,507 A | 6/1996 | McNamara et al. | 700/286 |
| 5,544,036 A | 8/1996 | Brown, Jr. et al. | 364/145 |
| 5,553,094 A | 9/1996 | Johnson et al. | 375/130 |
| 5,570,084 A | 10/1996 | Retter et al. | 370/338 |
| 5,572,438 A | 11/1996 | Ehlers et al. | 700/295 |
| 5,572,528 A | 11/1996 | Shuen | 370/402 |
| 5,596,722 A | 1/1997 | Rahnema | 709/241 |
| 5,608,721 A | 3/1997 | Natarajan et al. | 370/238 |
| 5,608,780 A | 3/1997 | Gerszberg et al. | 455/436 |
| 5,623,495 A | 4/1997 | Eng et al. | 370/397 |
| 5,659,300 A | 8/1997 | Dresselhuys et al. | 340/870.02 |
| 5,673,252 A | 9/1997 | Johnson et al. | 370/449 |
| 5,684,710 A | 11/1997 | Ehlers et al. | 700/293 |
| 5,696,501 A | 12/1997 | Ouellette et al. | 340/870.02 |
| 5,696,695 A | 12/1997 | Ehlers et al. | 700/286 |
| 5,717,718 A | 2/1998 | Rowsell et al. | 375/260 |
| 5,719,564 A | 2/1998 | Sears | 340/870.02 |
| 5,726,644 A | 3/1998 | Jednacz et al. | 340/825.52 |
| 5,727,057 A | 3/1998 | Emery et al. | 379/201.07 |
| 5,737,318 A | 4/1998 | Melnik | 370/254 |
| 5,740,366 A | 4/1998 | Mahany et al. | 709/227 |
| 5,748,104 A | 5/1998 | Argyroudis et al. | 340/870.11 |
| 5,757,783 A | 5/1998 | Eng et al. | 370/315 |
| 5,758,331 A | 5/1998 | Johnson | 705/412 |
| 5,761,083 A | 6/1998 | Brown, Jr. et al. | 364/492 |
| 5,767,790 A | 6/1998 | Jovellana | 340/870.02 |
| 5,774,660 A | 6/1998 | Brendel et al. | 709/201 |
| 5,812,531 A | 9/1998 | Cheung et al. | 370/255 |
| 5,822,309 A | 10/1998 | Ayanoglu et al. | 370/315 |
| 5,844,893 A | 12/1998 | Gollnick et al. | 370/329 |
| 5,874,903 A | 2/1999 | Shuey et al. | 340/870.02 |
| 5,880,677 A | 3/1999 | Lestician | 340/825.06 |
| 5,892,758 A | 4/1999 | Argyroudis | 370/335 |
| 5,894,422 A | 4/1999 | Chasek | 364/528.26 |
| 5,896,097 A | 4/1999 | Cardozo | 340/870.03 |
| 5,896,566 A | 4/1999 | Averbuch et al. | 455/419 |
| 5,898,387 A | 4/1999 | Davis et al. | 340/870.02 |
| 5,898,826 A | 4/1999 | Pierce et al. | 714/4 |
| 5,901,067 A | 5/1999 | Kao et al. | 700/11 |
| 5,903,566 A | 5/1999 | Flammer, III | 370/406 |
| 5,914,672 A | 6/1999 | Glorioso et al. | 340/870.02 |
| 5,914,673 A | 6/1999 | Jennings et al. | 340/870.03 |
| 5,919,247 A | 7/1999 | Van Hoff et al. | 709/217 |
| 5,920,697 A | 7/1999 | Masters et al. | 709/219 |
| 5,926,531 A | 7/1999 | Petite | 379/144.04 |
| 5,933,092 A | 8/1999 | Ouellette et al. | 340/870.02 |
| 5,953,371 A | 9/1999 | Rowsell et al. | 375/220 |
| 5,963,146 A | 10/1999 | Johnson et al. | 340/870.01 |
| 5,963,457 A | 10/1999 | Kanoi et al. | 364/528.26 |
| 5,974,236 A | 10/1999 | Sherman | 709/221 |
| 5,986,574 A | 11/1999 | Colton | 340/870.02 |
| 5,987,011 A | 11/1999 | Toh | 370/331 |
| 5,991,806 A | 11/1999 | McHann, Jr. | 709/224 |
| 6,014,089 A | 1/2000 | Tracy et al. | 340/870.02 |
| 6,018,659 A | 1/2000 | Ayyagari et al. | 455/431 |
| 6,026,133 A | 2/2000 | Sokoler | 375/365 |
| 6,028,522 A | 2/2000 | Petite | 340/641 |
| 6,044,062 A | 3/2000 | Brownrigg et al. | 370/238 |
| 6,058,355 A | 5/2000 | Ahmed et al. | 702/62 |
| 6,061,609 A | 5/2000 | Kanoi et al. | 700/291 |
| 6,073,169 A | 6/2000 | Shuey et al. | 709/217 |
| 6,075,777 A | 6/2000 | Agrawal et al. | 370/329 |
| 6,078,785 A | 6/2000 | Bush | 455/7 |
| 6,084,867 A | 7/2000 | Meier | 370/338 |
| 6,088,659 A | 7/2000 | Kelley et al. | 702/62 |
| 6,097,703 A | 8/2000 | Larsen et al. | 370/254 |
| 6,108,699 A | 8/2000 | Moiin | 709/221 |
| 6,118,269 A | 9/2000 | Davis | 324/110 |
| 6,122,603 A | 9/2000 | Budike, Jr. | 702/182 |
| 6,124,806 A | 9/2000 | Cunningham et al. | 340/870.02 |
| 6,134,587 A | 10/2000 | Okanoue | 709/222 |
| 6,137,423 A | 10/2000 | Glorioso et al. | 340/870.02 |
| 6,150,955 A | 11/2000 | Tracy et al. | 340/870.02 |
| 6,169,979 B1 | 1/2001 | Johnson | 705/412 |
| 6,172,616 B1 | 1/2001 | Johnson et al. | 340/870.12 |
| 6,195,018 B1 | 2/2001 | Ragle et al. | 340/870.01 |
| 6,218,953 B1 | 4/2001 | Petite | 340/641 |
| 6,233,327 B1 | 5/2001 | Petite | 379/155 |
| 6,239,722 B1 | 5/2001 | Colten et al. | 340/870.02 |
| 6,240,080 B1 | 5/2001 | Okanoue et al. | 370/338 |
| 6,246,677 B1 | 6/2001 | Nap et al. | 370/346 |
| 6,246,689 B1 | 6/2001 | Shavitt | 370/406 |
| 6,249,516 B1 | 6/2001 | Brownrigg et al. | 370/338 |
| 6,298,053 B1 | 10/2001 | Flammer, III et al. | 370/349 |
| 6,300,881 B1 | 10/2001 | Yee et al. | 340/870.02 |
| 6,304,556 B1 | 10/2001 | Haas | 370/254 |
| 6,311,105 B1 | 10/2001 | Budike, Jr. | 700/291 |
| 6,338,087 B1 | 1/2002 | Okanoue | 709/222 |
| 6,362,745 B1 | 3/2002 | Davis | 340/637 |
| 6,363,057 B1 | 3/2002 | Ardalan et al. | 370/252 |
| 6,366,217 B1 | 4/2002 | Cunningham et al. | 340/870.31 |
| 6,369,719 B1 | 4/2002 | Tracy et al. | 340/870.02 |
| 6,369,769 B1 | 4/2002 | Nap et al. | 343/719 |
| 6,373,399 B1 | 4/2002 | Johnson et al. | 340/870.11 |
| 6,396,839 B1 | 5/2002 | Ardalan et al. | 370/401 |
| 6,400,949 B1 | 6/2002 | Bielefeld et al. | 455/434 |
| 6,407,991 B1 | 6/2002 | Meier | 370/338 |
| 6,415,330 B1 | 7/2002 | Okanoue | 709/245 |
| 6,430,268 B1 | 8/2002 | Petite | 379/39 |
| 6,437,692 B1 | 8/2002 | Petite et al. | 340/540 |
| 6,457,054 B1 | 9/2002 | Bakshi | 709/227 |
| 6,480,497 B1 | 11/2002 | Flammer, III et al. | 370/400 |
| 6,480,505 B1 | 11/2002 | Johansson et al. | 370/449 |
| 6,492,910 B1 | 12/2002 | Ragle et al. | 340/870.02 |
| 6,509,841 B1 | 1/2003 | Colton et al. | 340/870.11 |
| 6,522,974 B2 | 2/2003 | Sitton | 702/17 |
| 6,535,498 B1 | 3/2003 | Larsson et al. | 370/338 |
| 6,538,577 B1 | 3/2003 | Ehrke et al. | 340/870.02 |
| 6,553,355 B1 | 4/2003 | Arnoux et al. | 706/13 |
| 6,556,830 B1 | 4/2003 | Lenzo | 455/450 |
| 6,577,671 B1 | 6/2003 | Vimpari | 375/146 |
| 6,606,708 B1 | 8/2003 | Devine et al. | 726/8 |
| 6,618,578 B1 | 9/2003 | Petite | 455/92 |
| 6,618,772 B1 | 9/2003 | Kao et al. | 710/15 |
| 6,628,764 B1 | 9/2003 | Petite | 379/106.01 |
| 6,633,823 B2 | 10/2003 | Bartone et al. | 702/57 |
| 6,636,894 B1 | 10/2003 | Short et al. | 709/225 |
| 6,650,249 B2 | 11/2003 | Meyer et al. | 340/870.28 |
| 6,653,945 B2 | 11/2003 | Johnson et al. | 340/870.02 |

(56) References Cited

U.S. PATENT DOCUMENTS

| | | | |
|---|---|---|---|
| 6,657,552 B2 | 12/2003 | Belski et al. | 340/870.02 |
| 6,665,620 B1 | 12/2003 | Burns et al. | 702/62 |
| 6,671,635 B1 | 12/2003 | Forth et al. | 702/61 |
| 6,681,110 B1 | 1/2004 | Crookham et al. | 455/420 |
| 6,681,154 B2 | 1/2004 | Nierlich et al. | 700/286 |
| 6,684,245 B1 | 1/2004 | Shuey et al. | 709/223 |
| 6,687,901 B1 | 2/2004 | Imamatsu | 717/173 |
| 6,691,173 B2 | 2/2004 | Morris et al. | 709/249 |
| 6,697,331 B1 | 2/2004 | Riihinen et al. | 370/236 |
| 6,710,721 B1 | 3/2004 | Holowick | 340/870.02 |
| 6,711,166 B1 | 3/2004 | Amir et al. | 370/395.1 |
| 6,711,409 B1 | 3/2004 | Zavgren, Jr. et al. | 455/445 |
| 6,711,512 B1 | 3/2004 | Noh | 702/65 |
| 6,714,787 B2 | 3/2004 | Reed et al. | 455/445 |
| 6,718,137 B1 | 4/2004 | Chin | 398/3 |
| 6,725,281 B1 | 4/2004 | Zintel et al. | 719/318 |
| 6,728,514 B2 | 4/2004 | Bandeira et al. | 455/13.1 |
| 6,747,557 B1 | 6/2004 | Petite et al. | 340/540 |
| 6,747,981 B2 | 6/2004 | Ardalan et al. | 370/401 |
| 6,751,445 B2 | 6/2004 | Kasperkovitz et al. | 455/76 |
| 6,751,455 B1 | 6/2004 | Acampora | 455/414.1 |
| 6,751,672 B1 | 6/2004 | Khalil et al. | 709/230 |
| 6,772,052 B1 | 8/2004 | Amundsen et al. | 700/291 |
| 6,775,258 B1 | 8/2004 | van Valkenburg et al. | 370/338 |
| 6,778,099 B1 | 8/2004 | Mayer et al. | 340/870.02 |
| 6,785,592 B1 | 8/2004 | Smith et al. | 700/291 |
| 6,798,352 B2 | 9/2004 | Holowick | 340/870.02 |
| 6,801,865 B2 | 10/2004 | Gilgenbach et al. | 702/61 |
| 6,826,620 B1 | 11/2004 | Mawhinney et al. | 709/235 |
| 6,829,216 B1 | 12/2004 | Nakata | 370/228 |
| 6,829,347 B1 | 12/2004 | Odiaka | 379/220.01 |
| 6,831,921 B2 | 12/2004 | Higgins | 370/401 |
| 6,836,737 B2 | 12/2004 | Petite et al. | 702/62 |
| 6,839,775 B1 | 1/2005 | Kao et al. | 710/15 |
| 6,842,706 B1 | 1/2005 | Baraty | 702/61 |
| 6,845,091 B2 | 1/2005 | Ogier et al. | 370/328 |
| 6,859,186 B2 | 2/2005 | Lizalek et al. | 343/767 |
| 6,865,185 B1 | 3/2005 | Patel et al. | 370/412 |
| 6,882,635 B2 | 4/2005 | Eitan et al. | 370/338 |
| 6,885,309 B1 | 4/2005 | Van Heteren | 340/870.11 |
| 6,891,838 B1 | 5/2005 | Petite et al. | 370/401 |
| 6,900,738 B2 | 5/2005 | Crichlow | 340/870.02 |
| 6,904,025 B1 | 6/2005 | Madour et al. | 370/328 |
| 6,904,385 B1 | 6/2005 | Budike, Jr. | 702/182 |
| 6,909,705 B1 | 6/2005 | Lee et al. | 370/338 |
| 6,914,533 B2 | 7/2005 | Petite | 340/628 |
| 6,914,893 B2 | 7/2005 | Petite | 370/338 |
| 6,946,972 B2 | 9/2005 | Mueller et al. | 340/870.02 |
| 6,954,814 B1 | 10/2005 | Leach | 710/305 |
| 6,963,285 B2 | 11/2005 | Fischer et al. | 340/635 |
| 6,967,452 B2 | 11/2005 | Aiso et al. | 318/466 |
| 6,970,434 B1 | 11/2005 | Mahany et al. | 370/256 |
| 6,970,771 B1 | 11/2005 | Preiss et al. | 700/286 |
| 6,975,613 B1 | 12/2005 | Johannson | 370/338 |
| 6,980,973 B1 | 12/2005 | Karpenko | 705/412 |
| 6,982,651 B2 | 1/2006 | Fischer | 340/870.02 |
| 6,985,087 B2 | 1/2006 | Soliman | 340/870.02 |
| 6,995,666 B1 | 2/2006 | Luttrell | 340/539.1 |
| 6,999,441 B2 | 2/2006 | Flammer, III et al. | 370/337 |
| 7,009,379 B2 | 3/2006 | Ramirez | 324/142 |
| 7,009,493 B2 | 3/2006 | Howard et al. | 340/7.1 |
| 7,010,363 B2 | 3/2006 | Donnelly et al. | 700/19 |
| 7,016,336 B2 | 3/2006 | Sorensen | 370/351 |
| 7,020,701 B1 | 3/2006 | Gelvin et al. | 709/224 |
| 7,042,368 B2 | 5/2006 | Patterson et al. | 340/870.29 |
| 7,046,682 B2 | 5/2006 | Carpenter et al. | 370/401 |
| 7,053,767 B2 | 5/2006 | Petite et al. | 340/531 |
| 7,053,853 B2 | 5/2006 | Merenda et al. | 343/820 |
| 7,054,271 B2 | 5/2006 | Brownrigg et al. | 370/238 |
| 7,062,361 B1 | 6/2006 | Lane | 700/295 |
| 7,064,679 B2 | 6/2006 | Ehrke et al. | 340/870.02 |
| 7,072,945 B1 | 7/2006 | Nieminen et al. | 709/217 |
| 7,079,810 B2 | 7/2006 | Petite et al. | 455/41.2 |
| 7,089,089 B2 | 8/2006 | Cumming et al. | 700/295 |
| 7,102,533 B2 | 9/2006 | Kim | 340/870.02 |
| 7,103,086 B2 | 9/2006 | Steed et al. | 375/132 |
| 7,103,511 B2 | 9/2006 | Petite | 702/188 |
| 7,106,044 B1 | 9/2006 | Lee, Jr. et al. | 324/110 |
| 7,119,713 B2 | 10/2006 | Shuey et al. | 340/870.02 |
| 7,126,494 B2 | 10/2006 | Ardalan et al. | 340/870.02 |
| 7,135,850 B2 | 11/2006 | Ramirez | 324/142 |
| 7,135,956 B2 | 11/2006 | Bartone et al. | 340/3.9 |
| 7,137,550 B1 | 11/2006 | Petite | 235/379 |
| 7,143,204 B1 | 11/2006 | Kao et al. | 710/18 |
| 7,145,474 B2 | 12/2006 | Shuey et al. | 340/870.03 |
| 7,170,425 B2 | 1/2007 | Christopher et al. | 340/870.02 |
| 7,174,260 B2 | 2/2007 | Tuff et al. | 702/61 |
| 7,185,131 B2 | 2/2007 | Leach | 710/305 |
| 7,188,003 B2 | 3/2007 | Ransom et al. | 700/286 |
| 7,197,046 B1 | 3/2007 | Hariharasubrahmanian | 370/466 |
| 7,200,633 B2 | 4/2007 | Sekiguchi et al. | 709/203 |
| 7,209,840 B2 | 4/2007 | Petite et al. | 702/62 |
| 7,215,926 B2 | 5/2007 | Corbett et al. | 455/41.2 |
| 7,222,111 B1 | 5/2007 | Budike, Jr. | 705/412 |
| 7,230,544 B2 | 6/2007 | Van Heteren | 340/870.03 |
| 7,230,931 B2 | 6/2007 | Struhsaker | 370/280 |
| 7,231,482 B2 | 6/2007 | Leach | 710/305 |
| 7,245,938 B2 | 7/2007 | Sobczak et al. | 455/562.1 |
| 7,248,181 B2 | 7/2007 | Patterson et al. | 340/870.03 |
| 7,248,861 B2 | 7/2007 | Lazaridis et al. | 455/414.1 |
| 7,250,874 B2 | 7/2007 | Mueller et al. | 340/870.06 |
| 7,251,570 B2 | 7/2007 | Hancock et al. | 702/57 |
| 7,263,073 B2 | 8/2007 | Petite et al. | 370/278 |
| 7,271,735 B2 | 9/2007 | Rogai | 340/870.02 |
| 7,274,305 B1 | 9/2007 | Luttrell | 340/870.02 |
| 7,274,975 B2 | 9/2007 | Miller | 700/295 |
| 7,277,027 B2 | 10/2007 | Ehrke et al. | 340/870.12 |
| 7,277,967 B2 | 10/2007 | Kao et al. | 710/18 |
| 7,289,887 B2 | 10/2007 | Rodgers | 700/295 |
| 7,295,128 B2 | 11/2007 | Petite | 340/628 |
| 7,301,476 B2 | 11/2007 | Shuey et al. | 340/870.03 |
| 7,304,587 B2 | 12/2007 | Boaz | 340/870.02 |
| 7,308,370 B2 | 12/2007 | Mason, Jr. et al. | 702/65 |
| 7,312,721 B2 | 12/2007 | Mason, Jr. et al. | 340/870.02 |
| 7,315,257 B2 | 1/2008 | Patterson et al. | 340/870.02 |
| 7,317,404 B2 | 1/2008 | Cumeralto et al. | 340/870.02 |
| 7,321,316 B2 | 1/2008 | Hancock et al. | 340/870.02 |
| 7,324,453 B2 | 1/2008 | Wu et al. | 370/238 |
| 7,327,998 B2 | 2/2008 | Kumar et al. | 455/405 |
| 7,346,463 B2 | 3/2008 | Petite et al. | 702/62 |
| 7,348,769 B2 | 3/2008 | Ramirez | 324/158.1 |
| 7,349,766 B2 | 3/2008 | Rodgers | 700/295 |
| 7,362,709 B1 | 4/2008 | Hui et al. | 370/237 |
| 7,366,113 B1 | 4/2008 | Chandra et al. | 370/255 |
| 7,366,191 B2 | 4/2008 | Higashiyama | 370/406 |
| 7,379,981 B2 | 5/2008 | Elliott et al. | 709/220 |
| 7,397,907 B2 | 7/2008 | Petite | 379/155 |
| 7,406,298 B2 | 7/2008 | Luglio et al. | 455/90.3 |
| 7,411,964 B2 | 8/2008 | Suemura | 370/400 |
| 7,427,927 B2 | 9/2008 | Borleske et al. | 340/870.02 |
| 7,451,019 B2 | 11/2008 | Rodgers | 700/295 |
| 7,457,273 B2 | 11/2008 | Nakanishi et al. | 370/338 |
| 7,468,661 B2 | 12/2008 | Petite et al. | 340/540 |
| 7,487,282 B2 | 2/2009 | Leach | 710/305 |
| 7,495,578 B2 | 2/2009 | Borleske | 340/870.02 |
| 7,498,873 B2 | 3/2009 | Opshaug et al. | 329/315 |
| 7,505,453 B2 | 3/2009 | Carpenter et al. | 370/352 |
| 7,512,234 B2 | 3/2009 | McDonnell et al. | 380/247 |
| 7,515,571 B2 | 4/2009 | Kwon et al. | 370/338 |
| 7,516,106 B2 | 4/2009 | Ehlers et al. | 705/412 |
| 7,522,540 B1 | 4/2009 | Maufer | 370/254 |
| 7,522,639 B2 | 4/2009 | Katz | 370/503 |
| 7,539,151 B2 | 5/2009 | Demirhan et al. | 370/254 |
| 7,545,285 B2 | 6/2009 | Shuey et al. | 340/870.02 |
| 7,548,826 B2 | 6/2009 | Witter et al. | 702/115 |
| 7,548,907 B2 | 6/2009 | Wall et al. | 1/1 |
| 7,554,941 B2 | 6/2009 | Ratiu et al. | 370/328 |
| 7,562,024 B2 | 7/2009 | Brooks et al. | 705/1.1 |
| 7,571,865 B2 | 8/2009 | Nicodem et al. | 236/51 |
| 7,586,420 B2 | 9/2009 | Fischer et al. | 340/635 |
| 7,599,665 B2 | 10/2009 | Sinivaara | 455/67.16 |
| 7,602,747 B2 | 10/2009 | Maksymczuk et al. | 370/331 |
| 7,609,673 B2 | 10/2009 | Bergenlid et al. | 370/329 |
| 7,613,147 B2 | 11/2009 | Bergenlid et al. | 370/329 |

(56) References Cited

U.S. PATENT DOCUMENTS

| | | | |
|---|---|---|---|
| 7,623,043 B2 | 11/2009 | Mizra et al. | 340/870.02 |
| 7,626,967 B2 | 12/2009 | Yarvis et al. | 370/338 |
| 7,650,425 B2 | 1/2010 | Davis et al. | 709/238 |
| 7,676,231 B2 | 3/2010 | Demirhan et al. | 455/452.1 |
| 7,680,041 B2 | 3/2010 | Johansen | 370/230 |
| 7,729,496 B2 | 6/2010 | Hacigumus | 380/277 |
| 7,733,224 B2 | 6/2010 | Tran | 340/540 |
| 7,743,224 B2 | 6/2010 | Wang | 711/154 |
| 7,756,538 B2 | 7/2010 | Bonta et al. | 455/517 |
| 7,788,491 B1* | 8/2010 | Dawson | 713/168 |
| 7,802,245 B2 | 9/2010 | Sonnier et al. | 717/171 |
| 7,814,322 B2 | 10/2010 | Gurevich et al. | 713/171 |
| 7,818,758 B2 | 10/2010 | de Bonet et al. | 719/318 |
| 7,847,706 B1 | 12/2010 | Ross et al. | 340/12.52 |
| 8,051,415 B2 | 11/2011 | Suzuki | 717/168 |
| 2001/0005368 A1 | 6/2001 | Rune | 370/390 |
| 2001/0010032 A1 | 7/2001 | Ehlers et al. | 702/62 |
| 2001/0038342 A1 | 11/2001 | Foote | 340/870.02 |
| 2001/0046879 A1 | 11/2001 | Schramm et al. | 455/525 |
| 2002/0012358 A1 | 1/2002 | Sato | 370/466 |
| 2002/0013679 A1 | 1/2002 | Petite | 702/188 |
| 2002/0031101 A1 | 3/2002 | Petite et al. | 370/310 |
| 2002/0051269 A1 | 5/2002 | Margalit et al. | 398/126 |
| 2002/0066095 A1 | 5/2002 | Yu | 717/173 |
| 2002/0110118 A1 | 8/2002 | Foley | 370/352 |
| 2002/0114303 A1 | 8/2002 | Crosbie et al. | 370/338 |
| 2002/0120569 A1 | 8/2002 | Day | 705/40 |
| 2002/0174354 A1 | 11/2002 | Bel et al. | 713/193 |
| 2002/0186619 A1 | 12/2002 | Reeves et al. | 368/47 |
| 2003/0001640 A1 | 1/2003 | Lao et al. | 327/165 |
| 2003/0001754 A1 | 1/2003 | Johnson et al. | 340/870.02 |
| 2003/0014633 A1 | 1/2003 | Gruber | 713/170 |
| 2003/0033394 A1 | 2/2003 | Stine | 709/222 |
| 2003/0037268 A1 | 2/2003 | Kistler | 713/310 |
| 2003/0050737 A1 | 3/2003 | Osann | 700/276 |
| 2003/0112822 A1 | 6/2003 | Hong et al. | 370/469 |
| 2003/0117966 A1 | 6/2003 | Chen | 370/255 |
| 2003/0122686 A1 | 7/2003 | Ehrke et al. | 340/870.02 |
| 2003/0123481 A1 | 7/2003 | Neale et al. | 370/466 |
| 2003/0156715 A1 | 8/2003 | Reeds, III et al. | 380/37 |
| 2003/0207697 A1 | 11/2003 | Shpak | 455/524 |
| 2003/0229900 A1 | 12/2003 | Reisman | 725/87 |
| 2003/0233201 A1 | 12/2003 | Horst et al. | 702/62 |
| 2004/0008663 A1 | 1/2004 | Srikrishna et al. | 370/351 |
| 2004/0031030 A1 | 2/2004 | Kidder et al. | 717/172 |
| 2004/0034773 A1 | 2/2004 | Balabine et al. | 713/168 |
| 2004/0039817 A1 | 2/2004 | Lee et al. | 709/225 |
| 2004/0056775 A1 | 3/2004 | Crookham et al. | 340/825 |
| 2004/0066310 A1 | 4/2004 | Ehrke et al. | 340/870.02 |
| 2004/0077341 A1 | 4/2004 | Chandranmenon et al. | 455/418 |
| 2004/0081086 A1 | 4/2004 | Hippelainen et al. | 370/227 |
| 2004/0082203 A1 | 4/2004 | Logvinov et al. | 439/10 |
| 2004/0100953 A1 | 5/2004 | Chen et al. | 370/389 |
| 2004/0113810 A1 | 6/2004 | Mason, Jr. et al. | 340/870.02 |
| 2004/0117788 A1 | 6/2004 | Karaoguz et al. | 717/177 |
| 2004/0125776 A1 | 7/2004 | Haugli et al. | 370/338 |
| 2004/0138787 A1 | 7/2004 | Ransom et al. | 700/295 |
| 2004/0140908 A1 | 7/2004 | Gladwin et al. | 340/870.02 |
| 2004/0157613 A1 | 8/2004 | Steer et al. | 455/446 |
| 2004/0183687 A1 | 9/2004 | Petite et al. | 340/601 |
| 2004/0185845 A1 | 9/2004 | Abhishek et al. | 455/422.1 |
| 2004/0193329 A1 | 9/2004 | Ransom et al. | 700/286 |
| 2004/0210544 A1 | 10/2004 | Shuey et al. | 705/412 |
| 2004/0268142 A1 | 12/2004 | Karjala et al. | 726/15 |
| 2005/0026569 A1 | 2/2005 | Lim et al. | 455/73 |
| 2005/0027859 A1 | 2/2005 | Alvisi et al. | 709/224 |
| 2005/0030968 A1 | 2/2005 | Rich et al. | 370/449 |
| 2005/0033967 A1 | 2/2005 | Morino et al. | 713/182 |
| 2005/0055432 A1 | 3/2005 | Rodgers | 709/223 |
| 2005/0058144 A1 | 3/2005 | Ayyagari et al. | 370/401 |
| 2005/0065742 A1 | 3/2005 | Rodgers | 702/62 |
| 2005/0122944 A1 | 6/2005 | Kwon et al. | 370/338 |
| 2005/0136972 A1 | 6/2005 | Smith et al. | 455/554.1 |
| 2005/0172024 A1 | 8/2005 | Cheifot et al. | 709/225 |
| 2005/0187928 A1 | 8/2005 | Byers | 1/1 |
| 2005/0193390 A1 | 9/2005 | Suzuki et al. | 717/178 |
| 2005/0195757 A1 | 9/2005 | Kidder et al. | 370/278 |
| 2005/0201397 A1 | 9/2005 | Petite | 370/401 |
| 2005/0228874 A1 | 10/2005 | Edgett et al. | 709/220 |
| 2005/0243867 A1 | 11/2005 | Petite | 370/474 |
| 2005/0249113 A1 | 11/2005 | Kobayashi et al. | 370/219 |
| 2005/0251403 A1 | 11/2005 | Shuey | 705/1 |
| 2005/0257215 A1 | 11/2005 | Denby et al. | 717/172 |
| 2005/0270173 A1 | 12/2005 | Boaz | 340/870.02 |
| 2005/0276243 A1 | 12/2005 | Sugaya et al. | 370/328 |
| 2005/0286440 A1 | 12/2005 | Strutt et al. | 370/253 |
| 2006/0028355 A1 | 2/2006 | Patterson et al. | 340/870.02 |
| 2006/0055432 A1 | 3/2006 | Shimokawa et al. | 327/5 |
| 2006/0056363 A1 | 3/2006 | Ratiu et al. | 370/338 |
| 2006/0056368 A1 | 3/2006 | Ratiu et al. | 370/338 |
| 2006/0077906 A1 | 4/2006 | Maegawa et al. | 370/254 |
| 2006/0087993 A1 | 4/2006 | Sengupta et al. | 370/310 |
| 2006/0098576 A1 | 5/2006 | Brownrigg et al. | 370/238 |
| 2006/0098604 A1 | 5/2006 | Flammer, III et al. | 370/337 |
| 2006/0111111 A1 | 5/2006 | Ovadia | 455/439 |
| 2006/0130053 A1 | 6/2006 | Buljore et al. | 717/173 |
| 2006/0140135 A1 | 6/2006 | Bonta et al. | 370/254 |
| 2006/0146717 A1 | 7/2006 | Conner et al. | 370/238 |
| 2006/0158347 A1 | 7/2006 | Roche et al. | 340/870.02 |
| 2006/0161310 A1 | 7/2006 | Lal | 700/295 |
| 2006/0167784 A1 | 7/2006 | Hoffberg | 705/37 |
| 2006/0184288 A1 | 8/2006 | Rodgers | 700/295 |
| 2006/0215583 A1 | 9/2006 | Castagnoli | 370/254 |
| 2006/0215673 A1 | 9/2006 | Olvera-Hernandez | 370/406 |
| 2006/0217936 A1 | 9/2006 | Mason et al. | 702/188 |
| 2006/0230276 A1 | 10/2006 | Nochta | 713/176 |
| 2006/0271244 A1 | 11/2006 | Cumming et al. | 700/291 |
| 2006/0271678 A1 | 11/2006 | Jessup et al. | 709/224 |
| 2007/0001868 A1 | 1/2007 | Boaz | 340/870.02 |
| 2007/0013547 A1 | 1/2007 | Boaz | 340/870.02 |
| 2007/0019598 A1 | 1/2007 | Prehofer | 370/338 |
| 2007/0036353 A1 | 2/2007 | Reznik et al. | 380/30 |
| 2007/0057767 A1 | 3/2007 | Sun et al. | 340/7.35 |
| 2007/0060147 A1 | 3/2007 | Shin et al. | 455/445 |
| 2007/0063866 A1 | 3/2007 | Webb | 340/870.02 |
| 2007/0063868 A1 | 3/2007 | Borleske | 340/870.03 |
| 2007/0085700 A1 | 4/2007 | Walters et al. | 340/870.02 |
| 2007/0087756 A1 | 4/2007 | Hoffberg | 455/450 |
| 2007/0089110 A1* | 4/2007 | Li | 717/178 |
| 2007/0101442 A1 | 5/2007 | Bondurant | 726/34 |
| 2007/0103324 A1 | 5/2007 | Kosuge et al. | 340/618 |
| 2007/0109121 A1 | 5/2007 | Cohen | 340/539.26 |
| 2007/0110024 A1 | 5/2007 | Meier | 370/351 |
| 2007/0120705 A1 | 5/2007 | Kiiskila et al. | 340/870.02 |
| 2007/0136817 A1 | 6/2007 | Nguyen | 726/26 |
| 2007/0139220 A1 | 6/2007 | Mirza et al. | 340/870.02 |
| 2007/0143046 A1 | 6/2007 | Budike, Jr. | 702/62 |
| 2007/0147268 A1 | 6/2007 | Kelley et al. | 370/254 |
| 2007/0169074 A1 | 7/2007 | Koo et al. | 717/168 |
| 2007/0169075 A1 | 7/2007 | Lill et al. | 717/168 |
| 2007/0169080 A1 | 7/2007 | Friedman | 717/168 |
| 2007/0174467 A1 | 7/2007 | Ballou, Jr. et al. | 709/227 |
| 2007/0177538 A1 | 8/2007 | Christensen et al. | 370/328 |
| 2007/0177576 A1 | 8/2007 | Johansen et al. | 370/351 |
| 2007/0177613 A1 | 8/2007 | Shorty et al. | 370/401 |
| 2007/0189249 A1 | 8/2007 | Gurevich et al. | 370/338 |
| 2007/0200729 A1 | 8/2007 | Borleske et al. | 340/870.02 |
| 2007/0201504 A1 | 8/2007 | Christensen et al. | 370/437 |
| 2007/0204009 A1 | 8/2007 | Shorty et al. | 709/218 |
| 2007/0205915 A1 | 9/2007 | Shuey et al. | 340/870.02 |
| 2007/0206503 A1 | 9/2007 | Gong et al. | 370/238 |
| 2007/0206521 A1 | 9/2007 | Osaje | 370/315 |
| 2007/0207811 A1 | 9/2007 | Das et al. | 455/450 |
| 2007/0210933 A1 | 9/2007 | Leach | 340/870.02 |
| 2007/0211636 A1 | 9/2007 | Bellur et al. | 370/238 |
| 2007/0239477 A1 | 10/2007 | Budike, Jr. | 705/412 |
| 2007/0248047 A1 | 10/2007 | Shorty et al. | 370/329 |
| 2007/0257813 A1 | 11/2007 | Vaswani et al. | 340/870.02 |
| 2007/0258508 A1 | 11/2007 | Werb et al. | 375/140 |
| 2007/0263647 A1 | 11/2007 | Shorty et al. | 370/406 |
| 2007/0265947 A1 | 11/2007 | Schimpf et al. | 705/35 |
| 2007/0266429 A1 | 11/2007 | Ginter et al. | 726/12 |
| 2007/0271006 A1 | 11/2007 | Golden et al. | 700/295 |
| 2007/0276547 A1 | 11/2007 | Miller | 700/295 |

(56) References Cited

U.S. PATENT DOCUMENTS

| | | | |
|---|---|---|---|
| 2008/0011864 A1 | 1/2008 | Tessier et al. | 236/51 |
| 2008/0018492 A1 | 1/2008 | Ehrke et al. | 340/870.03 |
| 2008/0024320 A1 | 1/2008 | Ehrke et al. | 340/870.02 |
| 2008/0031145 A1 | 2/2008 | Ethier et al. | 370/248 |
| 2008/0032703 A1 | 2/2008 | Krumm et al. | 455/456.1 |
| 2008/0037569 A1 | 2/2008 | Werb et al. | 370/406 |
| 2008/0042874 A1 | 2/2008 | Rogai | 340/870.03 |
| 2008/0046388 A1 | 2/2008 | Budike, Jr. | 705/412 |
| 2008/0048883 A1 | 2/2008 | Boaz | 340/870.02 |
| 2008/0051036 A1 | 2/2008 | Vaswani et al. | 455/69 |
| 2008/0063205 A1 | 3/2008 | Braskich et al. | 380/270 |
| 2008/0068217 A1 | 3/2008 | Van Wyk et al. | 340/870.11 |
| 2008/0068994 A1 | 3/2008 | Garrison et al. | 370/230 |
| 2008/0068996 A1 | 3/2008 | Clave et al. | 370/230.1 |
| 2008/0086560 A1 | 4/2008 | Monier et al. | 709/224 |
| 2008/0089314 A1 | 4/2008 | Meyer et al. | 370/349 |
| 2008/0095221 A1 | 4/2008 | Picard | 375/224 |
| 2008/0097782 A1 | 4/2008 | Budike, Jr. | 705/1.1 |
| 2008/0107034 A1 | 5/2008 | Jetcheva et al. | 370/238 |
| 2008/0117110 A1 | 5/2008 | Luglio et al. | 343/702 |
| 2008/0129538 A1 | 6/2008 | Vaswani et al. | 340/870.03 |
| 2008/0130535 A1 | 6/2008 | Shorty et al. | 370/310 |
| 2008/0130562 A1 | 6/2008 | Shorty et al. | 370/329 |
| 2008/0132185 A1 | 6/2008 | Elliott et al. | 455/115.4 |
| 2008/0136667 A1 | 6/2008 | Vaswani et al. | 340/870.02 |
| 2008/0151795 A1 | 6/2008 | Shorty et al. | 370/310 |
| 2008/0151824 A1 | 6/2008 | Shorty et al. | 370/329 |
| 2008/0151825 A1 | 6/2008 | Shorty et al. | 370/329 |
| 2008/0151826 A1 | 6/2008 | Shorty et al. | 370/329 |
| 2008/0151827 A1 | 6/2008 | Shorty et al. | 370/329 |
| 2008/0154396 A1 | 6/2008 | Shorty et al. | 700/90 |
| 2008/0159213 A1 | 7/2008 | Shorty et al. | 370/329 |
| 2008/0165712 A1 | 7/2008 | Shorty et al. | 370/310 |
| 2008/0170511 A1 | 7/2008 | Shorty et al. | 370/254 |
| 2008/0177678 A1 | 7/2008 | Di Martini et al. | 705/512 |
| 2008/0180274 A1 | 7/2008 | Cumeralto et al. | 340/870.02 |
| 2008/0181133 A1 | 7/2008 | Thubert et al. | 370/255 |
| 2008/0183339 A1 | 7/2008 | Vaswani et al. | 700/297 |
| 2008/0186202 A1 | 8/2008 | Vaswani et al. | 340/870.03 |
| 2008/0186203 A1 | 8/2008 | Vaswani et al. | 340/870.11 |
| 2008/0187001 A1 | 8/2008 | Vaswani et al. | 370/466 |
| 2008/0187116 A1 | 8/2008 | Reeves et al. | 379/106.09 |
| 2008/0189415 A1 | 8/2008 | Vaswani et al. | 709/226 |
| 2008/0189436 A1 | 8/2008 | Vaswani et al. | 709/242 |
| 2008/0204272 A1 | 8/2008 | Ehrke et al. | 340/870.02 |
| 2008/0205355 A1 | 8/2008 | Liu et al. | 370/338 |
| 2008/0224891 A1 | 9/2008 | Ehrke et al. | 340/870.02 |
| 2008/0225737 A1 | 9/2008 | Gong et al. | 370/252 |
| 2008/0238714 A1 | 10/2008 | Ehrke et al. | 340/870.02 |
| 2008/0238716 A1 | 10/2008 | Ehrke et al. | 340/870.03 |
| 2008/0272934 A1 | 11/2008 | Wang et al. | 340/870.11 |
| 2008/0283620 A1 | 11/2008 | Knapp | 236/12.16 |
| 2008/0310311 A1 | 12/2008 | Flammer et al. | 370/238 |
| 2008/0310377 A1 | 12/2008 | Flammer et al. | 370/338 |
| 2008/0317047 A1 | 12/2008 | Zeng et al. | 370/401 |
| 2008/0318547 A1 | 12/2008 | Ballou, Jr. et al. | 455/410 |
| 2009/0003214 A1 | 1/2009 | Vaswani et al. | 370/236 |
| 2009/0003232 A1 | 1/2009 | Vaswani et al. | 370/252 |
| 2009/0003243 A1 | 1/2009 | Vaswani et al. | 370/255 |
| 2009/0003356 A1* | 1/2009 | Vaswani et al. | 370/400 |
| 2009/0010178 A1 | 1/2009 | Tekippe | 370/254 |
| 2009/0034418 A1 | 2/2009 | Flammer, III et al. | 370/238 |
| 2009/0034419 A1 | 2/2009 | Flammer, III et al. | 370/238 |
| 2009/0034432 A1 | 2/2009 | Bonta et al. | 370/255 |
| 2009/0043911 A1 | 2/2009 | Flammer et al. | 709/238 |
| 2009/0046732 A1 | 2/2009 | Pratt, Jr. et al. | 370/406 |
| 2009/0055032 A1 | 2/2009 | Rodgers | 700/295 |
| 2009/0068947 A1 | 3/2009 | Petite | 455/462 |
| 2009/0077405 A1 | 3/2009 | Johansen | 713/323 |
| 2009/0079584 A1 | 3/2009 | Grady et al. | 340/870.02 |
| 2009/0082888 A1 | 3/2009 | Johansen | 700/94 |
| 2009/0096605 A1 | 4/2009 | Petite et al. | 340/539.22 |
| 2009/0102737 A1 | 4/2009 | Birnbaum et al. | 343/828 |
| 2009/0115626 A1 | 5/2009 | Vaswani et al. | 340/870.02 |
| 2009/0129575 A1 | 5/2009 | Chakroaborty et al. | 379/201.03 |
| 2009/0132220 A1 | 5/2009 | Chakroborty et al. | 703/13 |
| 2009/0134969 A1* | 5/2009 | Veillette | 340/3.1 |
| 2009/0135677 A1 | 5/2009 | Veillette | 368/47 |
| 2009/0135716 A1 | 5/2009 | Veillette | 370/221 |
| 2009/0135843 A1 | 5/2009 | Veillette | 370/406 |
| 2009/0136042 A1* | 5/2009 | Veillette | 380/279 |
| 2009/0138777 A1 | 5/2009 | Veillette | 714/748 |
| 2009/0161594 A1 | 6/2009 | Zhu et al. | 370/312 |
| 2009/0167547 A1 | 7/2009 | Gilbert | 340/662 |
| 2009/0168846 A1 | 7/2009 | Filippo, III et al. | 375/133 |
| 2009/0175238 A1 | 7/2009 | Jetcheva et al. | 370/329 |
| 2009/0179771 A1 | 7/2009 | Seal et al. | 340/870.04 |
| 2009/0201936 A1 | 8/2009 | Dumet et al. | 370/401 |
| 2009/0235246 A1 | 9/2009 | Seal et al. | 717/173 |
| 2009/0243840 A1 | 10/2009 | Petite et al. | 340/539.1 |
| 2009/0245270 A1 | 10/2009 | van Greunen et al. | 370/410 |
| 2009/0262642 A1 | 10/2009 | van Greunen et al. | 370/216 |
| 2009/0267792 A1 | 10/2009 | Crichlow | 340/870.02 |
| 2009/0285124 A1 | 11/2009 | Aguirre et al. | 370/255 |
| 2009/0303972 A1 | 12/2009 | Flammer, III et al. | 370/338 |
| 2009/0310593 A1 | 12/2009 | Sheynblat et al. | 370/350 |
| 2009/0315699 A1 | 12/2009 | Satish et al. | 340/533 |
| 2009/0319672 A1 | 12/2009 | Reisman | 709/227 |
| 2009/0320073 A1 | 12/2009 | Reisman | 725/51 |
| 2010/0017249 A1 | 1/2010 | Fincham et al. | 705/412 |
| 2010/0037069 A1 | 2/2010 | Deierling et al. | 713/193 |
| 2010/0037293 A1 | 2/2010 | St. Johns et al. | 726/2 |
| 2010/0040042 A1 | 2/2010 | van Greunen et al. | 370/350 |
| 2010/0060259 A1 | 3/2010 | Vaswani et al. | 324/86 |
| 2010/0061272 A1 | 3/2010 | Veillette | 370/254 |
| 2010/0061350 A1 | 3/2010 | Flammer, III | 370/338 |
| 2010/0073193 A1 | 3/2010 | Flammer, III | 340/870.11 |
| 2010/0074176 A1 | 3/2010 | Flammer, III et al. | 370/328 |
| 2010/0074304 A1 | 3/2010 | Flammer, III | 375/134 |
| 2010/0138660 A1 | 6/2010 | Haynes et al. | 713/171 |
| 2010/0238917 A1 | 9/2010 | Silverman et al. | 370/350 |
| 2010/0256830 A1 | 10/2010 | Kressner et al. | 700/291 |
| 2011/0004358 A1 | 1/2011 | Pollack et al. | 700/297 |
| 2011/0035073 A1 | 2/2011 | Ozog | 700/291 |
| 2011/0066297 A1 | 3/2011 | Saberi et al. | 700/287 |

FOREIGN PATENT DOCUMENTS

| | | | | |
|---|---|---|---|---|
| EP | 0 812 502 B1 | 8/2004 | | H04L 12/28 |
| EP | 0 740 873 B1 | 12/2005 | | H04L 12/44 |
| JP | 10-070774 | 3/1998 | | H04Q 5/00 |
| JP | 10-135965 | 5/1998 | | H04L 12/28 |
| WO | WO 95/12942 | 5/1995 | | H04L 12/44 |
| WO | WO 96/10307 | 4/1996 | | H04L 12/28 |
| WO | WO 96/10307 A1 | 4/1996 | | H04L 12/28 |
| WO | WO 00/54237 | 9/2000 | | G08B 23/00 |
| WO | WO 01/26334 A2 | 4/2001 | | H04L 29/06 |
| WO | WO 01/55865 A1 | 8/2001 | | G06F 13/00 |
| WO | WO 03/015452 | 2/2003 | | H04Q 9/00 |
| WO | WO 2005/091303 | 9/2005 | | G06F 9/445 |
| WO | WO 2006/059195 | 6/2006 | | G05D 3/12 |
| WO | WO 2007/015822 | 8/2007 | | H04L 12/28 |
| WO | WO 2007/132473 | 11/2007 | | G08C 17/00 |
| WO | WO 2008/027457 | 3/2008 | | G08B 23/00 |
| WO | WO 2008/033287 A2 | 3/2008 | | G08B 23/00 |
| WO | WO 2008/033514 A2 | 3/2008 | | G08B 25/00 |
| WO | WO 2008/038072 | 4/2008 | | H04Q 7/24 |
| WO | WO 2008/092268 A1 | 8/2008 | | G01D 7/06 |
| WO | WO 2009/067251 | 5/2009 | | G08C 19/00 |

OTHER PUBLICATIONS

Trilliant Networks, "The Trilliant AMI Solution," RFP SCP-07003, 50 pp., Mar. 22, 2007.

"ZigBee Smart Energy Profile Specification," ZigBee Profile 0x0109, Revision 14, Document 075356r14, 202 pp., May 29, 2008.

Hubaux, J. P., et al. "Towards Mobile Ad-Hoc WANs: Terminodes," 2000 IEEE, Wireless Communications and Networking Conference, WCNC, vol. 3, pp. 1052-1059, 2000.

Miklos, G., et al., "Performance Aspects of Bluetooth Scatternet Formation," First Annual Workshop on Mobile and Ad Hoc Networking and Computing, MobiHOC 2000, pp. 147-148, 2000.

(56) References Cited

OTHER PUBLICATIONS

Eng, K. Y., et al. "BAHAMA: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.
Lee, David J. Y., "Ricocheting Bluetooth," 2nd International Conference on Microwave and Millimeter Wave Technology Proceedings, ICMMT 2000, pp. 432-435, 2000.
Lilja, Tore, "Mobile Energy Supervision," Twenty-second International Telecommunications Energy Conference, 2000 INTELEC, pp. 707-712, 2000.
Parkka, Juha, et al., "A Wireless Wellness Monitor For Personal Weight Management," Proceedings of the 2000 IEEE EMBS International Conference on Information Technology Applications in Biomedicine, pp. 83-88, 2000.
Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.
Privat, G., "A System-Architecture Viewpoint on Smart Networked Devices," Microelectronic Engineering, vol. 54, Nos. 1-2, pp. 193-197, Dec. 2000.
Jonsson, U., et al., "MIPMANET—Mobile IP for Mobile Ad Hoc Networks," MobiHOC 2000, First Annual Workshop on Mobile and Ad Hoc Networking and Computing, pp. 75-85 (12 pp. with Abstract), 2000.
Kapoor, R., et al., "Multimedia Support Over Bluetooth Piconets," First Workshop on Wireless Mobile Internet, pp. 50-55, Jul. 2001.
Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.
Lim, A., "Distributed Services for Information Dissemination in Self-Organizing Sensor Networks," Journal of the Franklin Institute, vol. 338, No. 6, pp. 707-727, Sep. 2001.
Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.
Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.
Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.
"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101&CompanyId=3.
Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.
"AMRON Meter Management System" [online], [retrieved on May 12, 2005], 41 pp., Retrieved from the Internet: http://www.amronm5.com/products/.
Reexamination Application No. 90/008,011, filed Jul. 24, 2006, 75 pp.
Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.
Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.
Katz, Randy H. and Brewer, Eric A., "The Case for Wireless Overlay Networks," *Electrical Engineering and Computer Science Department, University of California, Berkeley*, 12 pp., 1996.
Johnson, David B., "Routing in Ad Hoc Networks of Mobile Hosts," IEEE, pp. 158-163, 1995.
Nachum Shacham, Edwin B. Brownrigg, & Clifford A. Lynch, *A Packet Radio Network for Library Automation*, 1987 IEEE Military Communications Conference, vol. 2 at 21.3.1, (Oct. 1987). (TN-IP 0004176-82).
Nachum Shacham & Janet D. Tornow, Future Directions in Packet Radio Technology, Proc. of the IEEE Infocom 1985 at 93 (Mar. 1985). (TN-IP 0005080-86), 17 pp.
John Jubin & Janet D. Tornow, The DARPA Packet Radio Network Protocols, Proc. of the IEEE, vol. 75, No. 1 at 21 (Jan. 1987). (TN-IP 0004930-41).
John Jubin, Current Packet Radio Network Protocols, Proc. of the IEEE Infocom1985 at 86 (Mar. 1985), (TN-IP 0004921-29), 9 pp.
David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), (TN-IP 0006929-46), 18 pp.
David B. Johnson, Mobile Host Internetworking Using IP Loose Source Routing, Carnegie Mellon University CMU-CS-93-128, DARPA Order No. 7330 (Feb. 1993), (TN-IP 0006911-28), 18 pp.
Daniel M. Frank, Transmission of IP Datagrams Over NET/ROM Networks, Proc. of the ARRL 7th Computer Networking Conference 1988 at 65 (Oct. 1988), (TN-IP 0006591-96), 6 pp.
Robert E. Kahn, et al., Advances in Packet Radio Technology, Proc. of the IEEE, vol. 66, No. 11, pp. 1468-1496 (Nov. 1978), (TN-IP 0004942-71).
Clifford A. Lynch & Edwin B. Brownrigg, Packet Radio Networks, Bergamon Press, 259-74 (1987), (TN-IP 0004018-175).
Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), (TN-IP 0005018-28), 11 pp.
William MacGregor, Jil Westcott, & Michael Beeler, Multiple Control Stations in Packet Radio Networks, 1982 IEEE Military Communications Conference, vol. 3 at 10.3-1 (Oct. 1982), (TN-IP 0004988-93), 6 pp.
Nachum Shacham & Jil Westcott, Future Directions in Packet Radio Architectures and Protocols, Proc. of the IEEE, vol. 75, No. 1 at 83 (Jan. 1987), (TN-IP 0008712-28), 17 pp.
David B. Johnson and David A. Maltz, Protocols for Adaptive Wireless and Mobile Networking, IEEE Personal Communications, Feb. 1996, p. 34-42.
Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.
David A. Beyer, Accomplishments of the DARPA SURAN Program, IEEE MILCOM 1990, p. 39.6.1-8.
William S. Hortos, Application of Neural Networks to the Dynamic Spatial Distribution of Nodes within an Urban Wireless Network, SPIE, vol. 2492, p. 58-70, 1995.
Nachum Shacham and Richard G. Ogier, Network Control and Data Transport for C3I Applications, IEEE 1987, p. 30.5.1-6.
John E. Rustad, Reidar Skaug, and Andreas Aasen, New Radio Networks for Tactical Communication, IEEE Jornal on Selected Areas in Communications, vol. 8, No. 5, p. 713-27, Jun. 1990.
Barry M. Leiner, Donald L. Nielson, and Fouad A. Tobagi, Issues in Packet Radio Network Design, Proceedings of the IEEE, vol. 75, No. 1, p. 6-20, Jan. 1987.
Janet Tornow, Functional Summary of the DARPA SURAP1 Network, DARPA, Sep. 1986, 17 pp.
John F. Shoch and Lawrence Stewart, Interconnecting Local Networks via the Packet Radio Network, Sixth Data Communications Symposium, Nov. 1979, pp. 153-158.

(56) References Cited

OTHER PUBLICATIONS

J.R. Cleveland, Performance and Design Considerations for Mobile Mesh Networks, IEEE MILCOM 96, vol. 1, p. 245-49.

Cmdr. R. E. Bruninga, USN, A Worldwide Packet Radio Network, Signal, vol. 42, No. 10, p. 221-230, Jun. 1988.

Nachum Shacham and Janet Tornow, Packet Radio Networking, Telecommunications, vol. 20, No. 9, p. 42-48, 64, 82, Sep. 1986.

Spencer T. Carlisle, Edison's NetComm Project, IEEE 1989, Paper No. 89CH2709-4-B5, p. B5-1-B5-4.

Brian H. Davies and T.R. Davies, The Application of Packet Switching Techniques to Combat Net Radio, Proceedings of the IEEE, vol. 75, No. 1, p. 43-55, Jan. 1987.

Fouad A. Tobagi, Richard Binder, and Barry Leiner, Packet Radio and Satellite Networks, IEEE Communications Magazine, vol. 22, No. 11, p. 24-40, Nov. 1984.

M. Scott Corson, Joseph Macker, and Stephen G. Batsell, Architectural Considerations for Mobile Mesh Networking, IEEE MILCOM 96, vol. 1, p. 225-9.

K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.

J. Jonquin Garcia-Luna-Aceves, A Fail-Safe Routing Algorithm for Multihop Packet-Radio Networks, IEEE INFOCOM '86, p. 434-43, Apr. 8-10, 1986.

Johanes P. Tamtomo, A Prototype of TCP/IP-Based Internet-PRNET for Land Information Networks and Services, Department of Surveying Engineering, University of New Brunswick, Jan. 25, 1993, 118 pp.

A. Alwan, et al., Adaptive Mobile Multimedia Networks, IEEE Personal Communications, p. 34-51, Apr. 1996.

Michael Ball, et al., *Reliability of Packet Switching Broadcast Radio Networks*, IEEE Transactions on Circuits and Systems, vol. Cas-23, No. 12, p. 806-13 ,Dec. 1976.

Kenneth Brayer, Implementation and Performance of Survivable Computer Communication with Autonomous Decentralized Control, IEEE Communications Magazine, p. 34-41, Jul. 1983.

Weidong Chen and Eric Lin, *Route Optimization and Locations Updates for Mobile Hosts*, Proceedings of the 16$^{th}$ ICDCS, p. 319-326, 1996.

Daniel Cohen, Jonathan B. Postel, and Raphael Rom, *IP Addressing and Routing in a Local Wireless Network*, IEEE INFOCOM 1992, p. 5A.3.1-7.

Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009.

Jonathan J. Hahn and David M. Stolle, *Packet Radio Network Routing Algorithms: A Survey*, IEEE Communications Magazine, vol. 22, No. 11, p. 41-7, Nov. 1984.

David A. Hall, *Tactical Internet System Architecture for the Task Force XXI*, IEEE 1996, p. 219-30.

Robert Hinden and Alan Sheltzer, *The DARPA Internet Gateway*, DARPA RFC 823, Sep. 1982, 45 pp.

Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico-Mayaguez, ACM 0-89791-568-2/93, p. 709-13, 1993.

David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.

David B. Johnson, *Route Optimization in Mobile IP*, Nov. 28, 1994, http://www.monarch.cs.rice.edu/internet-drafts/draft-ietf-mobileip-optim-00.txt (last visited Sep. 26, 2009), 32 pp.

Mark G. Lewis and J.J. Garcia-Luna-Aceves, *Packet-Switching Applique for Tactical VHF Radios*, 1987 IEEE MILCOM Communciations Conference, Oct. 19-22, 1987, Washington, D.C., p. 21.2.1-7.

Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.

Charles E. Perkins and Pravin Bhagwat, *A Mobile Networking System Based on Internet Protocol*, IEEE Personal Communications, First Quarter 1994, IEEE 1994, p. 32-41.

Richard Schulman, Richard Snyder, and Larry J. Williams, *SINCGARS Internet Controller—Heart of the Digitized Battlefield*, Proceedings of the 1996 Tactical Communications Conference, Apr. 30-May 2, 1996, Fort Wayne, Indiana, p. 417-21.

Nachum Shacham and Earl J. Craighill, *Dynamic Routing for Real-Time Data Transport in Packet Radio Networks*, Proceedings of INFOCOM 1982, IEEE 1982, p. 152-58.

R. Lee Hamilton, Jr. and Hsien-Chuen Yu, *Optimal Routing in Multihop Packet Radio Networks*, IEEE 1990, p. 389-96.

Carl A. Sunshine, *Addressing Problems in Multi-Network Systems*, Proceedings of INFOCOM 1982, IEEE 1982, p. 12-18.

J.J. Garcia-Luna-Aceves, *Routing Management in Very Large-Scale Networks*, North-Holland, Future Generations Computer Systems 4, 1988, pp. 81-93.

J.J. Garcia-Luna-Aceves, *A Minimum-hop Routing Algorithm Based on Distributed Information*, North-Holland, Computer Networks and ISDN Systems 16, 1988/89, p. 367-382.

D. Hubner, J. Kassubek, F. Reichert, *A Distributed Multihop Protocol for Mobile Stations to Contact A Stationary Infrastructure*, Third IEE Conference on Telecommunications, Conference Publication No. 331, p. 204-7.

Jens Zander and Robert Forchheimer, *The SOFTNET Project: A Retrospect*, IEEE EUROCON, Jun. 13-17, 1988, p. 343-5.

Mario Gerla and Jack Tzu-Chich Tsai, *Multicluster, Mobile, Multimedia Radio Network*, Wireless Networks 1, J.C. Baltzer AG, Science Publishers, 1995, p. 255-265.

F. G. Harrison, *Microwave Radio in the British TeleCom Access Network*, Second IEE National Conference on Telecommunications, Conference Publication No. 300, Apr. 2-5, 1989, p. 208-13.

Chai-Keong Toh, *A Novel Distributed Routing Protocol To Support Ad-Hoc Mobile Computing*, Conference Proceedings of the 1996 IEEE Fifteenth Annual International Phoenix Conference on Computers and Communications, Mar. 27-29, 1996, p. 480-6.

Fadi F. Wahhab, *Multi-Path Routing Protocol for Rapidly Deployable Radio Networks*, Thesis submitted to the Department of Electrical Engineering and Computer Science of the University of Kansas, 1994, 59 pp.

Jil Westcott and Gregory Lauer, *Hierarchical Routing for Very Large Networks*, IEEE MILCOM 1984, Oct. 21-24, 1984, Conference Record vol. 2, p. 214-8.

International Search Report and Written Opinion for Application No. PCT/US08/13027, dated Feb. 9, 2009, 6 pp.

International Search Report and Written Opinion for Application No. PCT/US08/13023, dated Jan. 12, 2009, 10 pp.

International Search Report and Written Opinion for Application No. PCT/US08/13019, dated Jan. 12, 2009, 13 pp.

International Search Report and Written Opinion for Application No. PCT/US08/13025, dated Jan. 13, 2009, 7 pp.

International Search Report and Written Opinion for Application No. PCT/US08/13018, dated Jan. 30, 2009, 9 pp.

International Search Report and Written Opinion for Application No. PCT/US08/13020, dated Jan. 9, 2009, 8 pp.

International Search Report and Written Opinion for Application No. PCT/US08/13028, dated Jan. 15, 2009, 9 pp.

International Search Report and Written Opinion for Application No. PCT/US08/13021, dated Jan. 15, 2009, 11 pp.

International Search Report and Written Opinion for Application No. PCT/US08/13016, dated Jan. 9, 2009, 7 pp.

International Search Report and Written Opinion for Application No. PCT/US08/13024, dated Jan. 13, 2009, 9 pp.

International Search Report and Written Opinion for Application No. PCT/US08/13022, dated Jan. 27, 2009, 10 pp.

International Search Report and Written Opinion for Application No. PCT/US08/13030, dated Jan. 9, 2009, 7 pp.

International Search Report and Written Opinion for Application No. PCT/US08/12161, dated Mar. 2, 2009, 13 pp.

International Search Report and Written Opinion for Application No. PCT/US08/13017, dated Mar. 18, 2009, 11 pp.

International Search Report and Written Opinion for Application No. PCT/US08/13026, dated Feb. 24, 2009, 9 pp.

(56) References Cited

OTHER PUBLICATIONS

International Search Report and Written Opinion for Application No. PCT/US08/13029, dated Feb. 2, 2009, 8 pp.
International Search Report and Written Opinion for Application No. PCT/US08/13032, dated May 12, 2009, 14 pp.
International Search Report and Written Opinion for Application No. PCT/US09/05008, dated Oct. 22, 2009, 8 pp.
Leis, John, "TCP/IP Protocol Family," pp. 1 and 42-43, Apr. 3, 2006.
Supplementary European Search Report for Application No. EP 08 85 1869, dated Dec. 30, 2010, 7 pp.
International Search Report and Written Opinion for Application No. PCT/US10/26956, dated May 19, 2010, 2 pp.
Supplementary European Search Report for Application No. EP 08 85 1132, dated Dec. 6, 2010, 9 pp.
Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).
Levis Stanford University, J. P. Vasseur, Cisco Systems, et al., "Overview of Existing Routing Protocols for Low Power and Lossy Networks," draft-levis-rl2n-overview-protocols-02.txt, IETF Standard-Working-Draft, Internet Engineering Task Force, IETF, Ch, No. 2, Nov. 17, 2007 (XP015054252) (ISSN: 0000-0004).
Culler Arch Rock, J.P. Vasseur, Cisco Systems, et al., "Routing Requirements for Low Power and Lossy Networks, draft-culler-rl2n-routing-reqs-01.txt," IETF Standard-Working-Draft, Internet Engineering Task Force, IETF, CH, No. 1, Jul. 7, 2007 (XP015050851) (ISSN: 000-0004).
Perkins, C. E., et al., "Ad Hoc On-Demand Distance Vector (AODV) Routing," Network Working Group Internet Draft, XX, Nov. 9, 2001 (XP002950167).
Postel, J., "RFC 793 Transmission Control Protocol," Sep. 1981 [retrieved on Jan. 1, 2007], Retrieved From the Internet: http://www.ietf.org/rfc/rfc0793.txt.
Supplementary European Search Report for Application No. EP 08 85 1927, dated Dec. 22, 2010, 10 pp.
Younis, M., et al., "Energy-Aware Routing in Cluster-Based Sensor Networks," Modeling, Analysis and Simulation of Computer and Telecommunications Systems, $10^{th}$ IEEE Proceedings on Mascots, Oct. 11-16, 2002, Piscataway, NJ (XP010624424) (ISNB: 978-0-7695-1840-4).
Supplementary European Search Report for Application No. EP 08 85 3052, dated Mar. 18, 2011, 10 pp.
Supplementary European Search Report for Application No. EP 08 85 1560, dated Mar. 24, 2011, 9 pp.
Supplementary European Search Report for Application No. EP 08 85 2992, dated Mar. 23, 2011, 6 pp.
International Search Report and Written Opinion for Application No. PCT/US2011/060694, dated Apr. 9, 2012, 10 pp.
International Search Report and Written Opinion for Application No. PCT/US2011/049227, dated Jan. 31, 2012, 9 pp.
International Search Report and Written Opinion for Application No. PCT/US12/22334, dated Apr. 9, 2012, 9 pp.
International Search Report and Written Opinion for Application No. PCT/US11/56620, dated Mar. 13, 2012, 8 pp.
Supplementary European Search Report for Application No. EP 08 84 2449, dated Nov. 29, 2011, 5 pp.

Lin, Shen, et al., "A Wireless Network Based on the Combination of Zigbee and GPRS" [online], [retrieved on Feb. 16, 2012], IEEE International Conference on Networking, Sensing and Control, Apr. 6-8, 2008, 4 pp., Retrieved From the Internet: http://ieeexplore.ieee.org/xpls/abs_all.jsp?arnumber=4525223.
Telegesis, "ZigBee Gateway Makes Your Meter Smart" [online], 2005 [retrieved on Feb. 16, 2012], 1 p., Retrieved From the Internet: http://www.telegesis.com/downloads/general/SSV%20IP%20gateway%20case%20study.pdf.
Supplementary European Search Report for Application No. EP 09 81 1849, dated Dec. 13, 2011, 9 pp.
Gerla, Mario, et al., Multicasting Protocols For High-Speed, Wormhole-Routing Local Area Networks, ACM SIGCOMM Computer Communication Review, vol. 26, No. 4, Oct. 4, 1996, pp. 184-193.
International Search Report and Written Opinion for Application No. PCT/US2011/049277, dated Jan. 31, 2012, 9 pp.
International Search Report and Written Opinion for Application No. PCT/US11/21167, dated Mar. 21, 2012, 8 pp.
"UCAIug Home Area Network System Requirements Specification, A Work Product of the OpenHAN Task Force Formed by the SG Systems Working Group Under the Open Smart Grid (OpenSG) Technical Committee of the UCA® International Users Group, Version 2.0," 157 pp., Aug. 30, 2010.
"ZigBee Smart Energy Profile Specification," ZigBee Profile: 0x0109, Revision 15, Dec. 1, 2008, Document 075345r15 (SEP Document), 244 pp.
Edison Electric Institute (EEI), "Uniform Business Practices for Unbundled Electricity Metering, vol. Two," Dec. 5, 2000, 196 pp., www.naesb.org/pdf/ubp120500.pdf.
"ZigBee Smart Energy Profile Specification," ZigBee Profile: 0x0109, Revision 16, Version 1.1, Document 075356r16ZB, 332 pp., Mar. 23, 2011.
"ZigBee Over-the-Air Upgrading Cluster," ZigBee Alliance, Document 095264r18, Revision 18, Version 1.0, 63 pp., Mar. 14, 2010.
IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (WPANs)," IEEE Computer Society, 323 pp., Sep. 8, 2006.
IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANs)," IEEE Computer Society, 679 pp., Oct. 1, 2003.
"ZigBee Cluster Library Specification," ZigBee Alliance, Document 075123r02ZB, 420 pp., May 29, 2008.
Liu, Ryan, et al., "A Survey of PEV Impacts on Electric Utilities," *EEE PES Innovative Smart Grid Technologies Conference*, Anaheim, California, 8 pp., Jan. 17-19, 2011.
"Utility/Lab Workshop on PV Technology and Systems," DTE Energy DER Technology Adoption, DEW Analysis of Renewable, PEV & Storage, Tempe, Arizona, 36 pp., Nov. 8-9, 2010.
"Network Device: Gateway Specification," ZigBee Alliance, ZigBee Document 075468r35, Revision 35, Version No. 1.0, 301 pp., Mar. 23, 2011.
International Search Report and Written Opinion for Application No. PCT/US12/28135, dated Jul. 5, 2012, 7 pp.

\* cited by examiner

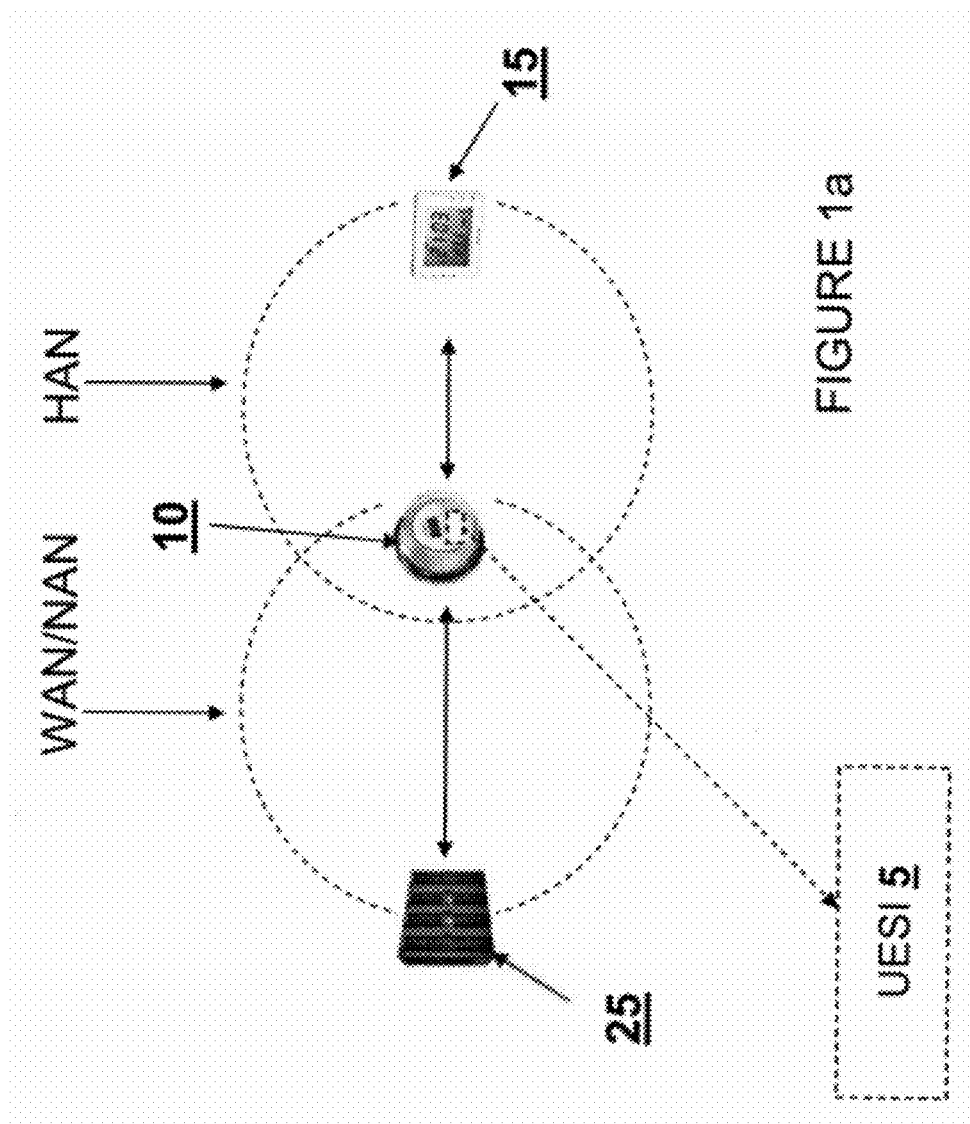

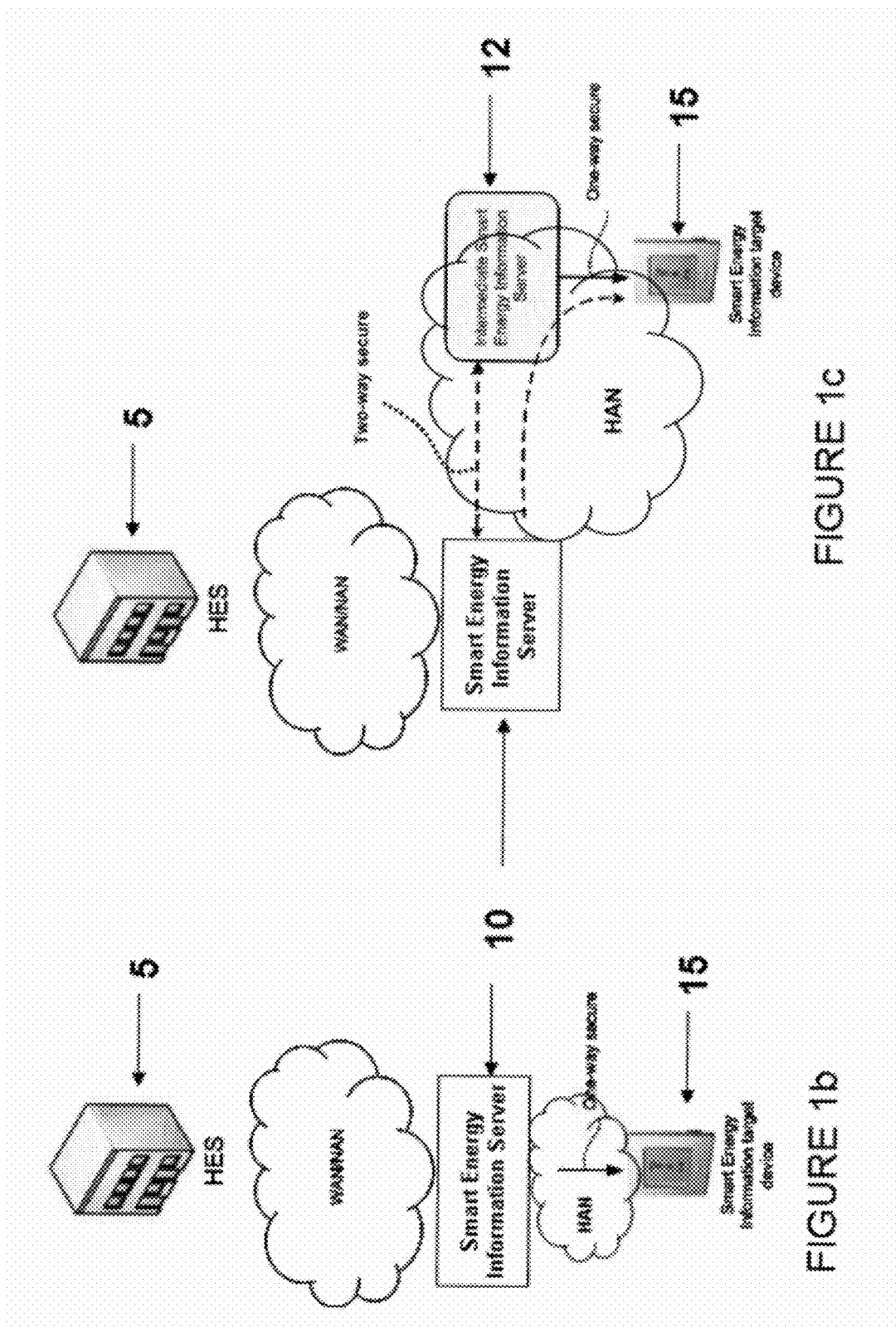

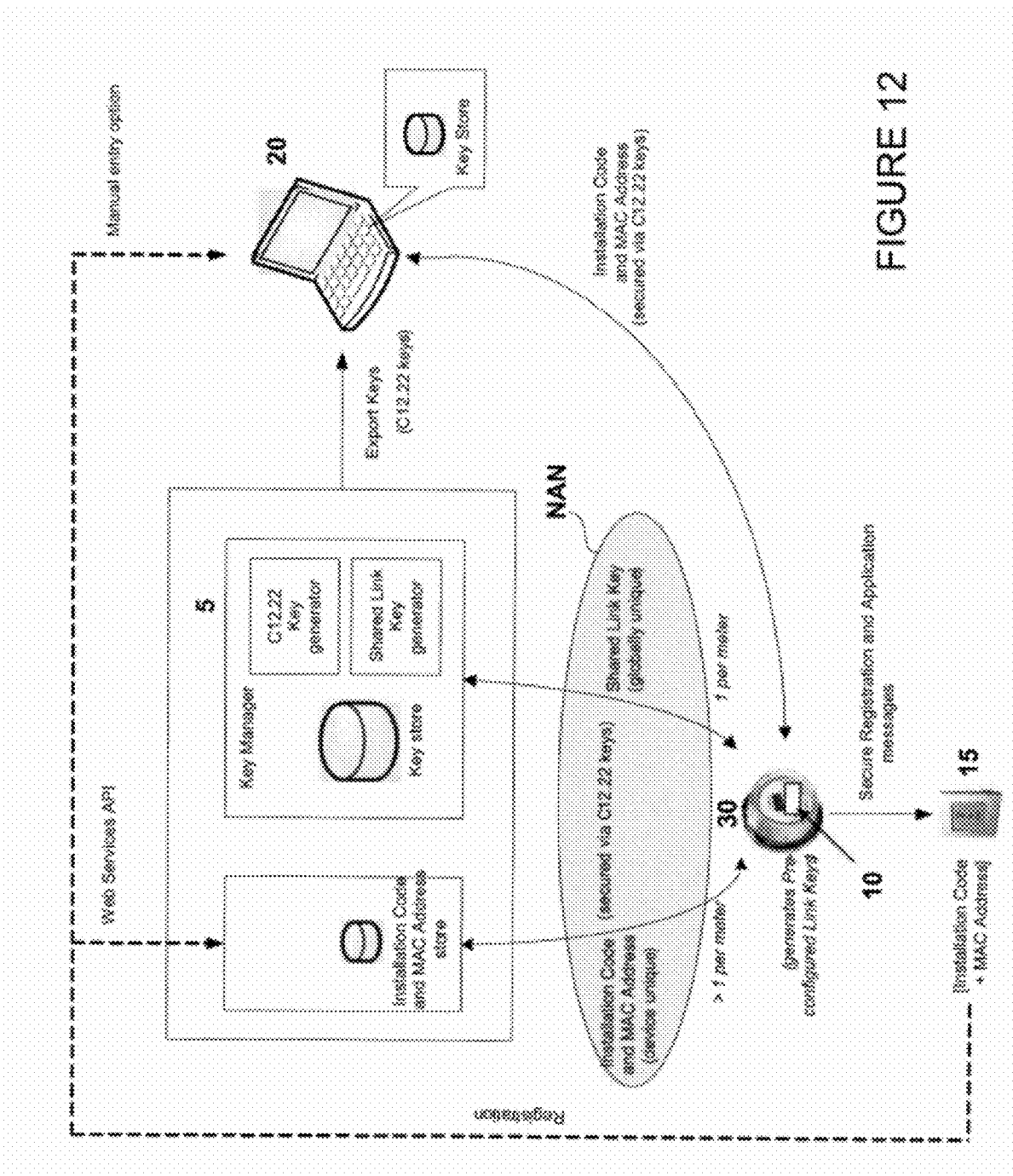

SYSTEM AND METHOD FOR SECURELY COMMUNICATING ACROSS MULTIPLE NETWORKS USING A SINGLE RADIO

CROSS-REFERENCE TO RELATED APPLICATIONS

The present application claims benefit of U.S. provisional patent application No. 61/413,538 titled "SYSTEMS AND METHODS FOR SINGLE RADIO USE ACROSS MULTIPLE NETWORKS" filed Nov. 15, 2010, which is incorporated herein by reference in its entirety and U.S. provisional patent application No. 61/441,375 titled "DEVICE AND METHOD FOR FACILITATING SECURE COMMUNICATIONS OVER A CELLULAR NETWORK" filed Feb. 10, 2011, also incorporated by reference herein in its entirety.

BACKGROUND OF THE INVENTION

1. Field of Embodiments

The present embodiments relate generally to a system and process that utilizes a single radio, i.e., a single transceiver, to bridge communications between multiple independent networks and facilitates secure one-way communication of information to devices on a single-hop network. More particularly, the various embodiments relate to making use of a single radio existing within a node of a network to facilitate secure communication from a back-end processor to both the node as part of a first network, e.g., neighbourhood area network ("NAN"), and end-use devices that are part of a second network, e.g., home area network ("HAN"). Additionally, various embodiments relate generally to a system and process that facilitates secure one-way and two-way communication of private information over a one-hop network such as a home area network (HAN).

2. Description of Related Art

In the utility delivery space, there have been numerous advances in technology in efforts to provide improved methods and systems for monitoring and controlling the delivery and use of various utilities, e.g., electricity, water, gas, etc. By way of specific example, advanced metering infrastructures ("AMIs") have been developed which incorporate smart meters or existing meters retrofitted with a communications component that include at least a radio, i.e., transceiver, and configurable microprocessor. These meters may be more generically referred to as nodes and are configured to communicate using predetermined protocols with other nodes in the AMI across what is commonly referred to as a neighbourhood area network ("NAN"). One primary function of the AMI is to monitor delivery, i.e., is delivery occurring at all as in the case of power outages, as well as reporting back meter readings to back-end systems. The ability to achieve this monitoring automatically and wirelessly is an important advancement over the wired, drive by or house-to-house meter reading methodologies of the past.

While the AMIs have vastly improved the flow of information to the utility companies regarding utility usage based on the meter readings, the utility usage associated with a single meter, e.g., within a particular residence or building can theoretically be further broken down according to individual load, e.g., by appliance. With the development of smart appliances, consumers are able to monitor and even control energy usage within their homes and businesses. Such appliances are also referred to as demand-side management ("DSM") devices or in-home devices ("IHDs"). A network of multiple smart appliances or individual load monitors is often referred to as a home area network ("HAN").

Various protocols, methodologies and system configurations have been developed in order to facilitate information and data transmission within the NAN, within the HAN and to and from aback-end system, usually requiring either a wired connection or transmission over another network, e.g., wide area network ("WAN"). Due to the differing protocols and methodologies, the hardware is quite often different or duplicative or requires complex programming in order to facilitate secure communication across varying devices and multiple networks.

It is desired to provide and request/receive communications including data related to utility consumption, rates and cost in real-time or quasi-real-time. Current configurations for facilitating such communication require additional components and/or software installation and complex routing in order to bridge the NAN-HAN. For example, U.S. Pat. No. 7,317,404 requires the addition of a specific transmitter to utility meters in order to transmit consumption data to a display module within the HAN. Further, U.S. Pat. No. 7,545,285 requires a master controller to listen in on communications between a meter and a reading system and perform in various actions, such as load interrupt, depending on the communication particulars. Further still, U.S. Pat. No. 7,427,927 requires a display with separate radio for listening to or requesting communications between a meter and a reading system and capturing certain meter data in a memory of the display for display to the user. Heretofore, all configurations for bridging the HAN-NAN communication gap require at least three radios: two in the meter (NAN and HAN) and one in a home device (HAN) for an architecture wherein the meter acts as the gateway; or one in meter (NAN) and two in the home device (HAN and NAN) for an architecture wherein a HAN device acts as the gateway.

Additionally, the Zigbee Smart Energy Profile (ZSE) version 1.0 supports a method for delivering information to DSM devices called Inter-PAN. This method consists of an IEEE 802.15.4 point to point communication between an Inter-PAN ZSE server and Inter-PAN ZSE clients. In version 1.0, this mechanism is limited to the transmission of public pricing information and public messages using a polling method. This means that each Inter-PAN ZSE client needs to request the information needed from one of the accessible Inter-PAN ZSE servers. There are no criteria in the selection of the Inter-PAN ZSE server used by an Inter-PAN client. This Inter-PAN configuration does not utilize any security, it is dependent on client requests to pull information from the server, information is limited to public messages and there is no guarantee that this server is associated the same premise.

The existing systems for providing and/or requesting communications including data related to utility consumption, rates and cost do not provide for secure wireless communication, electricity pricing information, premise association, and use of existing infrastructure. Accordingly, there is a need in the art for a method and system to provide price and energy usage information from an AMI network into the HAN in a way that reduces complexity, increases cybersecurity, and preserves consumer privacy.

Additionally, there is a need in the art for a mechanism to allow for secure, wireless communication between field tools and one or more nodes of a secure one-hop network, e.g., HAN, in an ad hoc fashion for performance of various tasks, e.g., operations and maintenance services (O&M services such as installations, configuration changes, firmware upgrades, etc.). There is a need in the art for a process and system for facilitating secure connection and communication with networked devices without requiring joinding with or creation of a network.

SUMMARY

In a first embodiment, a communications module for facilitating secure communications on a first network and a second network includes: a single transceiver for receiving and transmitting first network messages from and to the first network and at least transmitting second network messages to the second network; at least a first processor connected to the single transceiver for processing one or more first network messages and second network messages; the at least a first processor including first network logic for processing first network messages and second network logic for processing second network messages; and the second network logic including instructions for securing second network messages such that decryption of the second network messages is limited to a particular receiving device on the second network.

In a second embodiment, a process for registering a device located on a home area network with a communications module to facilitate receipt at the device of messages from the communications module that originated outside of the home area network includes: receiving a device registration key that is unique to the device at a head end system that is not on the home area network; receiving at the communications module the device registration key from the head end system; transmitting by the communications module a registration message encrypted with a version of the device registration key on multiple communication channels; listening by the device for registration messages on a particular communication channel within the multiple communication channels; and upon receiving on the particular communication channel the registration message encrypted with the device's registration key, decrypting the registration message to retrieve a shared link key for decrypting application messages from the communications module.

In a third embodiment, a process for registering multiple devices located on a home area network with a communications module to facilitate receipt at the multiple devices of messages from the communications module that originated outside of the home area network includes: receiving a unique device registration key for each of the multiple devices at a head end system that is not on the home area network; receiving at the communications module each of the unique device registration keys from the head end system; transmitting by the communications module on multiple communication channels individual registration messages each encrypted with a version of one the multiple device registration keys; listening by each of the multiple devices for registration messages on a particular communication channel within the multiple communication channels; upon receiving on the particular communication channel the registration message encrypted with an individual of the multiple device's registration key, decrypting the registration message to retrieve one of a first or second shared link key for decrypting application messages encrypted with one of the first or second shared link keys from the communications module; wherein each of the multiple devices on the home area network receives either the first or the second shared link key, but not both.

BRIEF DESCRIPTION OF THE FIGURES

FIGS. 1a through 1e are schematics showing representative components and networks of a system in accordance with various embodiments described herein;

FIG. 12 is a schematic showing various architectures for managing security keys across networks in accordance with one or more embodiments described herein; and

DETAILED DESCRIPTION

Figure 1E:
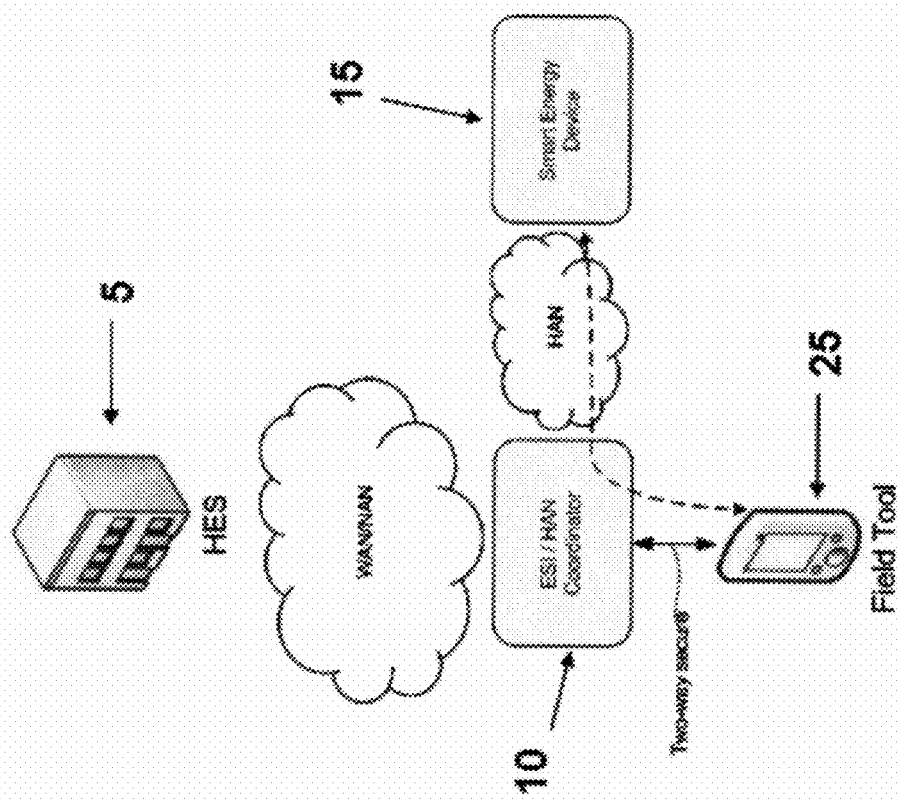

This document includes the following acronyms.

| | |
|---|---|
| AES | Advanced Encryption Standard |
| AMI | Advanced Metering Infrastructure |
| API | Application Programming Interface |
| APS | Application support sub-layer |
| CBKE | Certificate-based Key Establishment |
| CCM* | Modified 'Counter with Cipher Block Chaining Message Authentication Code' mode of operation for cryptographic block ciphers |
| CPP | Critical Peak Pricing |
| CSS | Customer Service System |
| ECC | Elliptic Curve Cryptography |
| EMS | Energy Management System |
| ENC-MIC-32 | 32-bit encryption mode composed of a combination of Encryption (ENC) and Message Integrity Code (MIC) modes. |
| UESI | Utility Energy Services Interface |
| ESP | Energy Services Portal - a ZSE embodiment of an ESI |
| EUI64 | Extended Universal Identifier-64 |
| HAN | Home Area Network |
| HES | Head-End Server (or System) |
| IHD | In-Home Display |
| ISO | Independent System Operator |
| LED | Light Emitting Diode |
| LSB | Least Significant Bit |
| MAC | Medium Access Control (referring to protocol stack sublayer) |
| MMO | Matyas-Meyer-Oseas one way hash function |
| NAN | Neighborhood Area Network |
| NWK | Network |
| OOB | Out-of-band |
| PAN | Personal area network |
| PCT | Programmable Communicating Thermostat |
| PEV | Plug-in Electric Vehicle |
| PHY | Physical Layer (referring to protocol stack sublayer) |
| RF | Radio Frequency |
| SE | Smart Energy |
| TOU | Time of Use pricing schedule |
| UTC | Coordinated Universal Time standard |

-continued

| | |
|---|---|
| UTF-8 | 8-bit Unicode Transformation Format Unicode Transformation Format |
| ZCL | ZigBee Cluster Library |
| ZSE | ZigBee Smart Energy |

The following documents are incorporated herein by reference in their entirety: "UCAIug Home Area Network System Requirements Specification: A Work Product of the OpenHAN Task Force formed by the SG Systems Working Group under the Open Smart Grid (OpenSG) Technical Committee of the UCA International Users Group," Version 2.0—Aug. 30, 2010 (OHP Document); "ZigBee Smart Energy Profile Specification," ZigBee Profile: 0x0109; Revision 15, Dec. 1, 2008, Document 075356r15 (SEP Document); ZigBee Smart Energy Test Specification, May 2008 ZigBee Document 075384r17; ZigBee Cluster Library Specification, ZigBee Document 075123r02ZB; and Institute of Electrical and Electronics Engineers, Inc., IEEE Std. 802.15.4-2003 & 2006, IEEE Standard for Information Technology—Telecommunications and Information Exchange between Systems—Local and Metropolitan Area Networks—Specific Requirements—Part 15.4: Wireless Medium Access Control (MAC) and Physical Layer (PHY) Specifications for Low Rate Wireless Personal Area Networks (WPANs).

Additionally, throughout the document, the terms and phrases HAN device, client device, Inter-PAN client device, Inter-PAN client and client are used interchangeably. Similarly, the terms and phrases Inter-PAN server and UESI are used interchangeably.

Referring to FIG. 1a, a simplified schematic illustrates the various networks utilized in a system of the present invention, including wide area network (WAN)/neighbourhood area network (NAN) (also referred to as an AMI network) and home area network (HAN) and representative components within each network. For example, the WAN/NAN communicates with the head end server (HES) for requesting, processing, transmitting communications to/from nodes including, e.g., a meter (also referred to as an AMI node), shown in FIG. 1a as an electric meter; and the HAN includes end user devices such as thermostats. As discussed further below, the system has at least the following features: a single radio for both NAN and HAN communications; HAN device may exist on a separate logically secure HAN network; uses same MAC/PHY layer in both NAN and HAN; secure links between NAN nodes (e.g., meters, stand-alone, thermostats that are retrofitted or originally manufactured to include the Utility Energy Service Interface (UESI) hardware and logic described herein) into the HAN; secure communications between meter and NAN; and simplified commissioning process.

In operation, the AMI node receives a security key from AMI network that itself is encrypted using the AMI security which is at the application layer as described further in pending U.S. patent application Ser. No. 12/554,135 entitled: A SYSTEM AND METHOD FOR IMPLEMENTING MESH NETWORK COMMUNICATIONS USING A MESH NETWORK PROTOCOL which is incorporated herein by reference in its entirety. The AMI node uses this security key to authenticate and encrypt communications to the HAN devices at the MAC layer. The encryption and authentication mechanisms may be different as between the AMI network and the HAN network.

Information is pushed from the AMI node using a single radio that simultaneously operates the AMI network and the HAN network. Information is automatically sent to the associated HAN devices using one-way communication (or two way communication in accordance with a particular embodiment). The transmission of information to HAN devices occurs even if these devices are not capable of sending messages back to the sending AMI node. The AMI node sends messages into the HAN on all channels in the communication band and this operation occurs simultaneously with AMI network communications. The communication is performed by a single radio in the AMI node, where the AMI network and the HAN operate on the same MAC/PHY layers but different routing protocols. In this configuration, a single radio in an AMI node (e.g. electric, gas, water meter) is used to transmit information into the HAN and potentially receive information from the HAN, where the single radio simultaneously supports communication protocols for both the NAN network and HAN network. The reduction from two to a single radio reduces costs for parts as well complexity of electronics. Additionally, the communications with the HAN are secured because the HAN key is not transmitted in the clear per secure key establishment using the pre-existing secure AMI communications. Secure communications between the AMI node and the HAN devices protect consumer information. Further, in one configuration, the flow of information is one-way from the AMI node into the HAN. This prevents unintended data flow of personal information from the HAN and into the AMI network.

Certain exemplary embodiments presented herein describe a Utility Energy Service Interface (UESI) that enables one-way (and two-way communications) of, e.g., private consumer-specific information to registered home area network (HAN) devices. Referring again to FIG. 1a, the UESI 5 is part of an electric (or other utility) meter 10 capable of securely broadcasting information, e.g., price and energy usage information, to a HAN device 15. Specific embodiments further describe HAN device requirements for interaction with the UESI. In a representative embodiment, various ZigBee components used in this implementation include: ZigBee SEP Inter-PAN, ZigBee ZCL attribute reporting, the ZigBee SEP 1.0 Price cluster, and the Simple Meter cluster. Secure, originator-authenticated communication is achieved through the use of the ZigBee pre-configured application layer security.

Figure 2A:
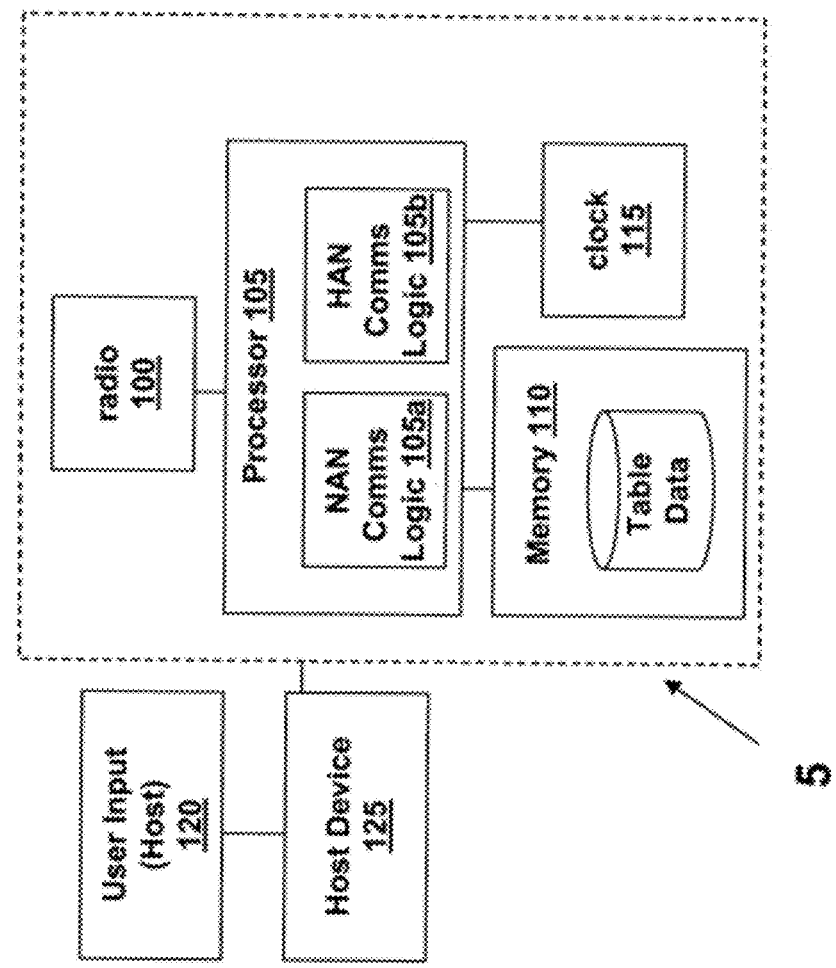
FIGS. 2a and 2b are schematics showing a representative UESI in accordance with various embodiments described herein.
Figure 2B:
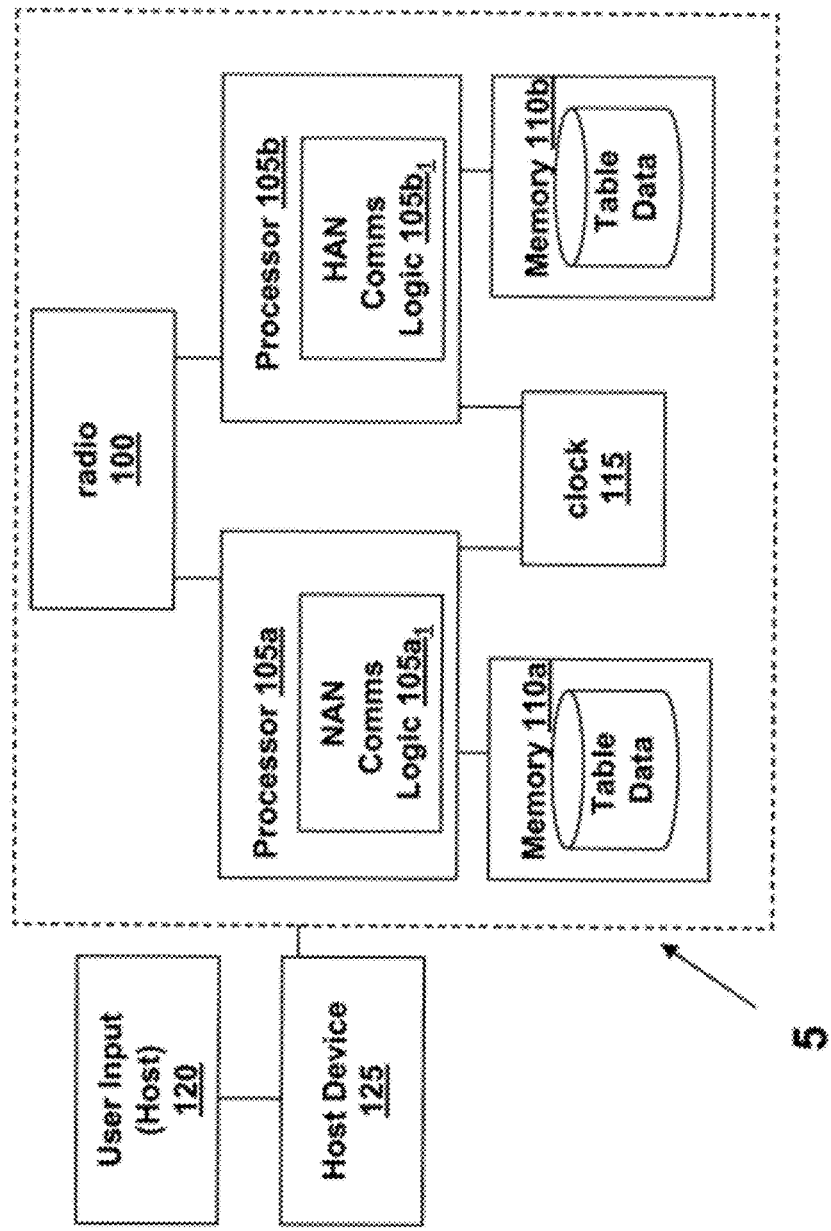

Referring to FIG. 2a, an exemplary UESI 5 includes at least a radio 100, a processor 105 which includes separate communications logic for communicating with the NAN 105a and HAN 105b, a memory 110 which includes at least one database for storing table data, and a clock 115 for synchronization. Optionally, the UESI 5 is in communication with a user input component and a display device which are part of the node 10 (or other host device, e.g., stand-alone box, smart thermostat, etc.). Alternatively, the UESI 5 could include separate processors and databases for the NAN and HAN communications as shown in FIG. 2b. The UESI clock is synchronized in accordance with the WAN/NAN clock as described in, for example, U.S. patent application Ser. No. 13/275,682 entitled "METHOD FOR SYNCHRONIZING METER CLOCKS IN A NETWORK" which is incorporated herein by reference in its entirety.

Coordination by the UESI of both NAN and HAN communications may occur autonomously in accordance with randomization processes implemented at the UESI or may be the result of predetermined coordination instructions passed down from, for example, the HES. Many messages are not based on relative time but on an absolute time mark. In an exemplary Time of Use (TOU) plan, tier switch occurs at, for example 5 PM and with it, a publish price message is broadcasted by UESIs currently using this TOU plan. Using randomization, a reduction of the strain on the WAN/NAN network of having all UESIs broadcasting and going "off the WAN/NAN network" simultaneously is achieved by introducing a random offset specific to each UESI for all transmissions. This offset is randomly generated between, for example, 0 and 60 seconds, and is applied to all transmissions so as to evenly spread out the transmission over the minute following the transmission request. An offset between 0 and 120 seconds is applied to registration packets as their impact on the network is greater considering they have to broadcast on all channels and that, under normal circumstances they request rebroadcasts less often than application messages.

Additionally, the UESI may be programmed with a soft switch, allowing for switching over from WAN/NAN only to dual use WAN/NAN and one-way HAN, or dual use WAN/NAN plus two-way HAN. The embodiments described herein are focused on descriptions of one-way HAN commissioning, registration and communications. Accordingly, the UESI can exist in three separate operational states controlled by the soft switch.

As described in the applicable OpenHAN 2.0 protocol (OHP), the UESI enables secure one-way interactions between commissioned HAN devices registered to the particular UESI and the UESI utility's advanced metering infrastructure (AMI). Security on this interface is robust and comprehensive in order to protect Utility assets (e.g. electric grid, AMI, etc.) and consumer information. The UESI is an interface for providing real-time energy usage information from the AMI meter or other node to HAN devices and is protected with cryptographic methods. The UESI is based on a secure one-way model where real-time information only flows from the UESI to registered HAN devices—an approach that inherently provides protection of Utility assets, as no HAN originated traffic flows upstream from the UESI into the AMI network.

The UESI is designed to do at least the following: register HAN devices, i.e., facilitate the OHP Commissioning process and Registration process for client devices to be able to successfully receive broadcast messages from the UESI; including updating the security keys and network parameters; broadcast price signals, i.e., broadcast electricity price information as received from the HES, or optionally based on a configured local schedule (e.g. every 10 minutes); broadcast energy usage, i.e., periodically broadcast energy usage information based on a configured local schedule (e.g. every 1 minute).

Implementation of an OHP compliant UESI that supports private broadcasts of consumer-specific information into a premise, requires some extensions to the current version of ZigBee SEP, as detailed below. UESI communications with client devices are based on the Inter-PAN transmission mechanism, which allows for communications via a special "stub" of the Application Support Sub-Layer, accessible through a special Service Access Point (SAP). Inter-PAN lends itself very well for this function because of its simplicity and effectiveness to address HAN devices. Unlike previous implementations wherein Inter-PAN was optional, it is a mandatory component of the processes described herein. Table 1 below lists the extensions which facilitate secure Inter-PAN communications to support private broadcasts. Table 1 highlights differences between existing ZigBee Smart Energy (ZSE) Inter-PAN features and extensions required for UESI implementation pursuant to OHP requirements.

TABLE 1

| Feature | ZSE version 1.0 Inter-PAN | Extensions |
|---|---|---|
| Communications mode | Uses IEEE 802.15.4 point-to-point communications between an Inter-PAN ZSE server and Inter-PAN ZSE client. | Uses IEEE 802.15.4 point-to-multipoint communications between a UESI and Inter-PAN client. |
| Security | Inter-PAN communications do not utilize security. | Communications are secured using the OOB Pre-Configured Link Key Process defined in the ZigBee Smart Energy Profile 1.0 specification, and uses AES-128/CCM* authenticated encryption to provide originator authentication as specified by the OHP specification security requirement for registered HAN devices. |
| Pull vs. Push | Inter-PAN communications rely on the ZSE client device to pull information from the ZSE server. This means that each Inter-PAN ZSE client needs to request the information needed from one of the accessible Inter-PAN ZSE servers. | Information is automatically pushed to the associated Inter-PAN clients.<br><br>This approach allows for transmission of information to Inter-PAN clients, even if these clients are not capable of sending messages back to the server |
| Smart Energy application | In ZSE version 1.0, the Inter-PAN mechanism is limited to: Public Pricing information and Public Messages | Enables the support for private consumer information: Pricing information using the Price Cluster PublishPrice command. Energy usage information using the ZCL report attribute format to transmit Simple Metering Cluster server attributes. |
| Addressing | Inter-PAN supports the use of PAN ID in addition to MAC Address. | All communication is from the UESI to the Inter-Pan client device, using the PAN ID, client device's MAC Address, and short broadcast MAC Address. |

TABLE 1-continued

| Feature | ZSE version 1.0 Inter-PAN | Extensions |
| --- | --- | --- |
| | Initial communications from the ZSE client device to ZSE server are broadcast to both the PAN ID and Destination Address, and are intended to facilitate the ZSE client device finding a ZSE server with the appropriate resource (i.e. availability to provide pricing or message information). Subsequent communications from the ZSE client device to the ZSE server may be unicast to both the PAN ID and Destination Address of the ZSE server. However, all communications from the ZSE server to the ZSE client device are unicast. | No direct communications from the client device to the server |
| Client-server binding within a premise | There are no defined criteria in the selection of the Inter-PAN ZSE server used by an Inter-PAN client device, and no guarantee that the selected server is associated with the same premise as the ZSE client device. | A defined registration mechanism enables service association with a specific premise |

Referring to FIG. 1b in a first embodiment facilitating one-way secure Inter-PAN communication to devices on a HAN, including a HES 5 which communicates over a WAN and NAN with a UESI (also referred to as a master smart energy information server) 10 which communicates information securely to one or more target devices 15 on a HAN. In this embodiment, the UESI provides secure smart energy information, e.g., publish price, energy usage information, load control information, text messages, directly to an subscribed target device. In the one-way Inter-PAN process, the objective is to provide sender authentication and confidentiality via encryption (as compared to two-way Inter-PAN, where the objective is to provide mutual authentication and confidentiality). As described further herein, for both one-way and two-way scenarios, there is an authentication phase followed by a phase where both parties arrive at a shared link key, which is then used to encrypt communications during the authorized session, and is valid until it times out.

Figure 4:
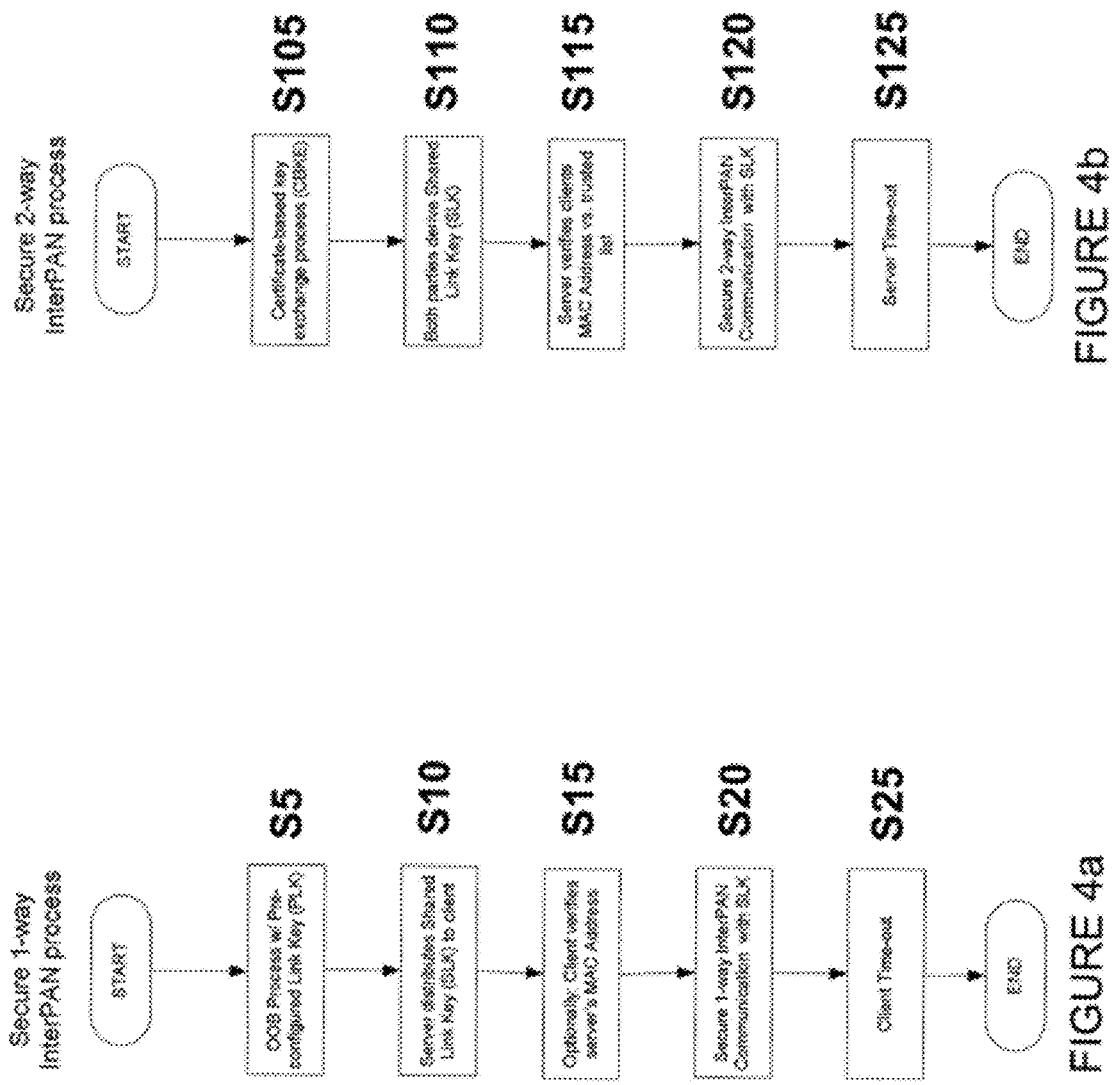
FIGS. 4a and 4b are process flows for general steps in secure one-way and secure two-way inter-PAN processes in accordance with embodiments described herein.

Referring to FIG. 4a, for one-way Inter-PAN, sender authentication and key distribution is achieved via an out-of-band registration process ("OOB") S5 using a pre-configured link key (PLK) which is unique to each target device. During registration, a shared link key ("SLK") is sent from the UESI to each registered target device as part of the payload of the registration message which is encrypted with the PLK S10. The SLK is then used by the sender, e.g., UESI, to encrypt each application message S20. An optional step S15 includes a filter for verifying at the target device the MAC address of the UESI. The target device times out if it cannot process an application message with a predetermined amount of time S25. Optionally the sender could also sign its messages using its private key, if a public/private key system is supported (public keys could be embedded in target devices during manufacturing).

The prior art ZigBee processes and components provide for a stand-alone Energy Services Interface (ZEST) that communicates information to ZigBee HAN devices. In accordance with embodiments herein, the ZEST and the UESI are able to coexist in the same premises, in compliance with OHP. In this scenario, a HAN device (e.g., IHD) can communicate independently with two physically different devices: a UESI in meter and a standalone ZESI. The registering process between the UESI, ZEST and HAN devices is as follows: The ZEST registers with the UESI and receives a Shared Link Key, Channel Mask and PAN-ID. The ZEST shall avoid any channels reserved by the UESI, as indicated via the Channel Mask. The ZEST shall avoid the PAN-ID used by the UESI. One or more HAN devices can register with the UESI and receive the Shared Link Key, Channel Mask and PAN-ID. After the ZEST is registered with the UESI, each HAN device can register with the ZEST and negotiate to receive a Network Key, a different PAN-ID and channel, the Trust Center Link Key, and optional Application Link Keys. A HAN device that communicates with both the UESI and the ZESI requires support of frequency agility to switch between channels. Whenever the ZESI receives a Registration message from the UESI requiring changes to the Shared Link key, Channel Mask, and/or PAN-ID, the ZEST shall initiate updates of its client devices via procedures described in the SEP Document which is incorporated herein by reference.

Alternatively, as shown in FIG. 1c, the ZESI may act as an intermediate smart energy server, communicating with the UESI using two-way secure inter-PAN while using one-way secure inter-PAN to communicate with other HAN devices.

Clients of the UESI shall support the Commissioning and Registration states that comply with the OHP as described further herein. Generally, commissioning refers to the process by which a HAN device obtains access to a specific physical network and allows the device to be discovered on that network. The process may involve the exchange of information based on security credentials required to establish network coordination, assign device addresses, and to route packets. Admission to the network allows the HAN device to communicate with peer devices on a network and receive public information from the UESI, but not information reserved for Registered devices. Generally, registration refers to the process by which a commissioned HAN device is authorized to communicate on a logical network. This involves the exchange of information based on security credentials with a UESI. The registration process is required for the exchange of information based on security credentials between a registered device and the UESI and among other devices registered to that UESI.

Figure 3:
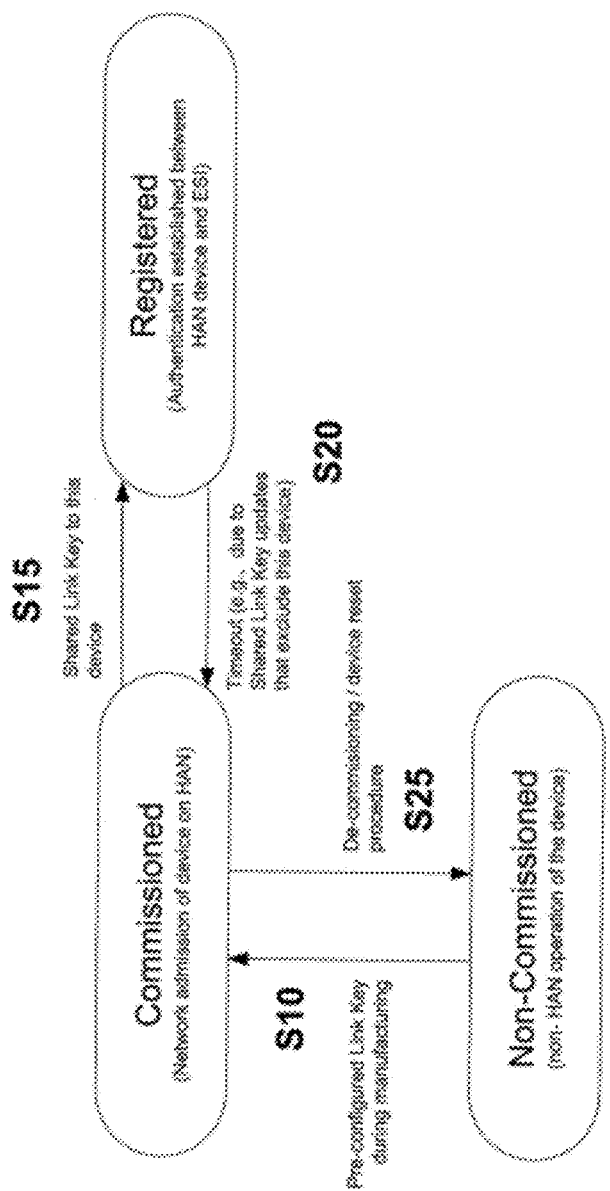
FIG. 3 is a schematic showing states of a client device in accordance with various embodiments described herein.

FIG. 3 illustrates the three primary supported states of devices and the transition flows between states in accordance with certain embodiments described herein. A non-commissioned device does not operate on the HAN. In order to become commissioned, a pre-configured link key established during manufacture of the device is shared with the UESI S10. After commissioning, registration may be achieved with a shared link key which establishes authentication between the individual device and the UESI S15. More particularly, when powered-on in the commissioned state, the device automatically enters a state ready to accept registration commands from the UESI, which includes the shared link key, as part of the registration process. In reverse, the device becomes unregistered in the event of a timeout, e.g., due to shared link key updates that exclude the particular device S20. And de-commissioning occurs as a result of a predetermined de-commission procedure or device reset procedure S25. Once registered, a client device is capable of receiving smart energy (SE) Application messages from the UESI. A registered client device shall receive all SE Application messages, i.e., there is no selective registration required for published pricing or energy usage messages. Upon receiving an SE Application message, the client device will read the Destination MAC (D-MAC) Address. If the D-MAC Address is the client device's own MAC Address, the client device shall process the message with the Pre-configured Link key. If the D-MAC Address is the broadcast short MAC Address, the client device shall process the message with the Shared Link Key.

Figure 5:
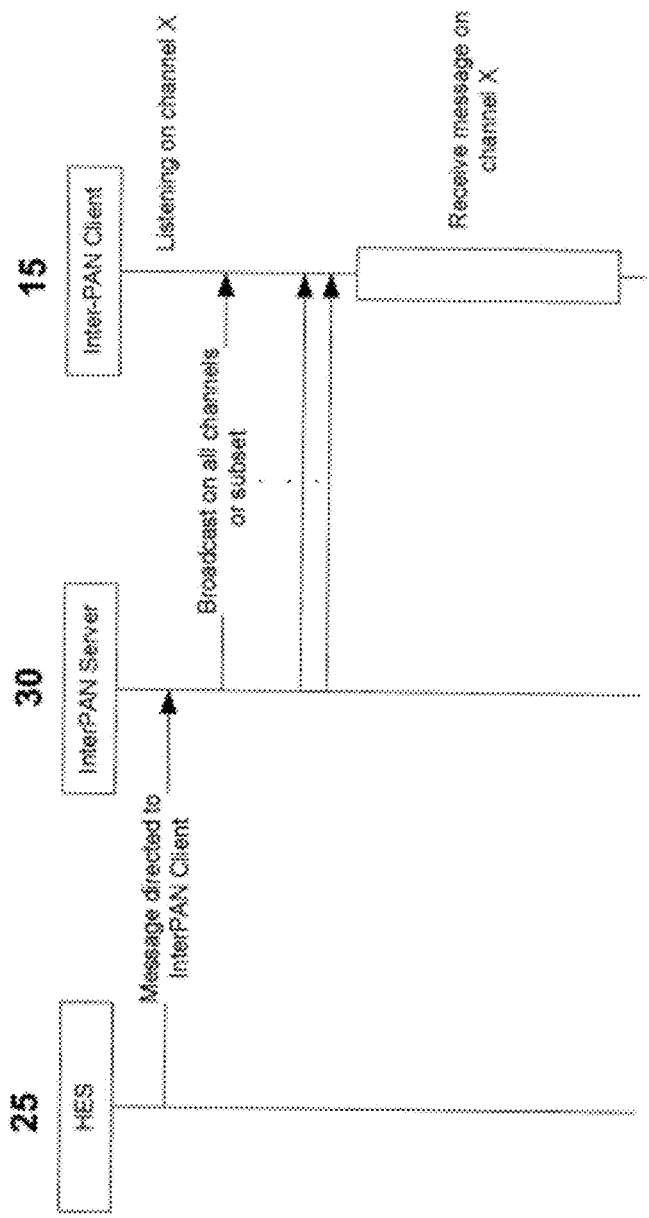
FIG. 5 is a schematic showing communication flow between various components and networks in accordance with various embodiments described herein.

In accordance with a one-way broadcast model, in FIG. 5, the UESI 5 (i.e., Inter-PAN server) receives messages from a Utility HES 25 that are directed to one or more HAN devices 15 (i.e., Inter-PAN client) and broadcasts the messages on multiple IEEE 802.15.4 channels. This is a point-to-multipoint communication. This approach eliminates the need for explicit channel management and allows the HAN devices to select the most appropriate channel based on their own proprietary selection algorithms. The specific 802.15.4 channels, on which the UESI transmits each message, depend on whether it is a registration message or an application message.

Two types of messages are supported: registration messages for client registration and network parameter updates, i.e., channel mask and PAN ID, and application messages including the publish price and energy usage messages, as well as text messages. Each registration message is sent on all 802.15.4 channels in order to sequentially reach all client devices, regardless of the channels on which the individual client devices are listening. This registration message includes a two byte channel mask field that informs the client devices about the channels on which the application messages will be sent. Each application message, i.e., publish price or energy usage message, is sequentially broadcast on all 802.15.4 channels identified by the channel mask field. The client device must listen to one or more of the identified channels. In certain embodiments, the UESI has the possibility to change its channel and PAN ID if the need arises in order to work with a specific AMI network. A change in its channel selection or PAN ID will result in registration messages including a new channel mask field and PAN ID for the devices. Messages are addressed to Inter-PAN clients based on a combination of the RF Channel Mask, Destination PAN ID, and 802.15.4 Destination Address fields. In a particular exemplary embodiment, an addressing strategy is summarized as set forth in Table 2.

TABLE 2

| Message type | RF Channel | Destination PAN-ID | Destination Address |
|---|---|---|---|
| Registration | All | Client's default PAN ID which is the CRC16 of its MAC Address | Client's MAC Address |
| Application | As specified via the RF Channel Mask | Server's selected PAN ID | 0xFFFF |

Exemplary values for the different communication intervals are shown in Table 3 below:

TABLE 3

| Interval | Description | Value (minutes) |
|---|---|---|
| Client Registration timeout | Period during which a Commissioned client waits for an initial Registration message. After this time expires, the client may need to be triggered again (e.g., via a reset or pushbutton) | 180 |
| Registration message period | Period between Registration messages | 60 |
| Publish Price message period | Period between Publish Price messages | 5-15 |
| Energy Usage message period | Period between Energy Usage messages | 1 |
| Application message timeout | Period after which a Registered client stops waiting for Application messages and resets to the Commissioned State to hunt for Registration messages | 30 |

The Physical layer is defined in section 6.5 (2450 MHz PHY specifications) of the IEEE 802.15.4-2006 standard, the specification of which is incorporated herein by reference. Tables contain the list of fields in their order of transmission; the first field listed is transmitted first. All multi-bytes fields are encoded Least Significant Byte first (LSB). The definition of each field is not provided in this document but can be found in the different documents referenced herein which are incorporated by reference in their entirety. Table 4 is representative of physical layer parameters.

TABLE 4

| Field names | Data type | Value |
|---|---|---|
| Preamble | 4 bytes | |
| Start-of-Frame Delimiter (SFD) | 1 byte | |
| Frame structure | | See Data link layer defined below |

The Data link layer is defined in section 7 (MAC sub-layer specification) of the IEEE 802.15.4-2006 standard. As indicated earlier, all messages are sent by the UESI and/or the ZESI in the particular embodiment wherein the ZESI is registered with the UESI as described previously herein. Two frame types are defined: (1) Registration and (2) Application. Tables contain the list of fields in their order of transmission; the first field listed is transmitted first. All multi-bytes fields are encoded Least Significant Byte first (LSB). The definition of each field is not provided in this document but can be found in the different documents referenced herein which are incorporated by reference in their entirety. The frame format used by the Registration message is sent unicast to each client's MAC Address and default PAN ID which is the CRC16 of the client's MAC Address. Table 5a is representative of physical layer parameters.

TABLE 5a

| Fields name | Data type | Value |
|---|---|---|
| Frame control | 2 bytes | |
| Frame type | Bits 0 to 2 | Data (001) |
| Security enabled | Bit 3 | False (0) |
| Frame pending | Bit 4 | False (0) |
| Ack. request | Bit 5 | False (0) |
| Intra-PAN | Bit 6 | False (0) |
| Dest. Addressing mode | Bits 10 to 11 | Long address (11) |
| Source addressing mode | Bits 14 to 15 | Long address (11) |
| Sequence number | 1 byte | Unique identifier |
| Addressing fields | | |
| Destination PAN identifier | 2 bytes | Client's default PAN ID |
| Destination address | 8 bytes | MAC address of the Inter-PAN client |
| Source PAN identifier | 2 bytes | Pan ID of the Inter-PAN server |
| Source address | 8 bytes | MAC address of the Inter-PAN server |
| Frame Payload | | See Network layer defined below |
| MIC | 4 bytes | Authenticator |
| FCS | 2 bytes | Frame Check Sequence |

Table 5b contains the list of fields in their order of transmission for the application layer message format for registration messages. The first field listed is transmitted first. All multi-bytes fields are encoded Least Significant Byte first (LSB).

TABLE 5b

| Fields name | Data type | Description and value |
|---|---|---|
| ZigBee APS Header | | |
| APS frame control | 1 byte | |
| Frame type | Bits 0 to 1 | Inter-PAN transmission (11) |
| Delivery Mode | Bits 2 to 3 | Unicast (00) |
| Security | Bit 5 | True (1) |
| ACK request | Bit 6 | False (0) |
| Extended Header Present | Bit 7 | False (0) |
| Cluster identifier | 2 bytes | (0xfc00) |
| Profile identifier | 2 bytes | ZigBee Smart Energy (0x0109) |
| Auxiliary Header | | |
| Security control | | |
| Security level | Bits 0 to 2 | ENC-MIC-32 (101) |
| Key identifier | Bits 3 to 4 | A data key(00) |
| Extended nonce | Bit 5 | (0) |
| Frame counter | 4 bytes | |
| ZCL header | | |
| Frame control | 1 byte | |
| Frame type | Bits 0 to 1 | Command is specific to a cluster (01) |
| Manufacturer specific | Bit 2 | True(1) |
| Direction | Bit 3 | From the server(1) |
| Disable default response | Bit 4 | True(1) |
| Manufacturer code | 2 bytes | 0x10C7 (Trilliant) |
| Transaction sequence number | 1 byte | Unique ID generated by the Inter-PAN server |
| Command identifier | 1 byte | 0x00 |
| ZCL payload | | |
| PAN ID | 2 bytes | PAN ID assigned to this Premise and used for Application messages |
| Channel Mask | 2 byte bitmap | Bitmap representing IEEE 802.15.4 channel IDs (11 to 26) that the server will use for this Premise (LSB = 11) |
| Shared Link key | 16 bytes | AES-128 key assigned to this Premise and used for subsequent communications |
| Publish Price Message Period (seconds) | 2 bytes | Interval between Publish Price messages, configured at the Server |
| Energy Usage Message Period (seconds) | 2 bytes | Interval between Energy Usage messages, configured at the Server |
| Registration Message Period (seconds) | 2 bytes | Interval between Registration messages, configured at the Server |

This frame format is used for SE broadcast messages, i.e., Publish Price and Energy Usage Messages, which are sent from the Inter-PAN server to Inter-PAN clients. Tables contain the list of fields in their order of transmission; the first field listed is transmitted first. All multi-bytes fields are encoded Least Significant Byte first (LSB). The definition of each field is not provided in this document but can be found in the different documents referenced herein which are incorporated by reference in their entirety. Table 6 is representative of application message parameters.

TABLE 6

| Fields name | Data type | Value |
| --- | --- | --- |
| Frame control | 2 bytes | |
| Frame type | Bits 0 to 2 | Data (001) |
| Security enabled | Bit 3 | False (0) |
| Frame pending | Bit 4 | False (0) |
| Ack. request | Bit 5 | False (0) |
| Intra-PAN | Bit 6 | False (0) |
| Dest. Addressing mode | Bits 10 to 11 | Short address (10) |
| Source addressing mode | Bits 14 to 15 | Long address (11) |
| Sequence number | 1 byte | Unique identifier |
| Addressing fields | | |
| Destination PAN identifier | 2 bytes | PAN ID assigned to this Premise and used for subsequent application messages |
| Destination address | 2 bytes | Broadcast address (0xFFFF) |
| Source PAN identifier | 2 bytes | Pan ID of the Inter-PAN server |
| Source address | 8 bytes | MAC address of the Inter-PAN server |
| Frame Payload | | See Network layer defined bellow |
| MIC | 4 bytes | Authenticator |
| FCS | 2 bytes | Frame Check Sequence |

The Network layer is defined in Annex B.4 (Frame Formats) of the ZigBee Smart Energy Profile version 1.0 revision 15 which is incorporated herein by reference it its entirety.

The complete descriptions of each field contained in the list below can also be found in section 3.3.1 (General NPDU Frame Format) of the ZigBee Specification (053474r17). Tables contain the list of fields in their order of transmission; the first field listed is transmitted first. All multi-bytes fields are encoded Least Significant Byte first (LSB). The definition of each field is not provided in this document but can be found in the different documents referenced herein which are incorporated by reference in their entirety. Table 7 is representative of network layer parameters.

TABLE 7

| Fields name | Data type | Value |
| --- | --- | --- |
| NWK frame control | 2 bytes | (0x0b00) |
| Frame type | Bits 0 to 1 | Inter-PAN transmission (11) |
| Protocol version | Bits 2 to 5 | 2 (0010) |
| Application Payload | | See Application layer defined bellow |

The UESI supports a variety of HAN devices, including battery-supported 'sleepy' devices. Sleepy devices are not always available to receive registration messages. When a non-commissioned sleepy device first starts up, it shall stay awake until it hears the registration message addressed to it (it may time-out after a reasonable long timeout period). The registration message provides three parameters that inform the client of message periodicities; allowing it to synchronize its wake cycles: registration message period, publish price message period, and energy usage message period. Typical values are shown in Table 4 above.

The security of the UESI is based on two types of Link Keys: one pre-configured Link Key to secure individual Registration messages, and a shared Link Key to secure broadcast Application messages. The shared Link Key is distributed via the Registration message.

The security model utilizes features from ZSE 1.0 security, while simplifying the model as appropriate to achieve originator-authenticated communication as required by OHP. A comparison to the full ZSE 1.0 security is shown in the Table 8.

The Registration process establishes the authentication and security between the UESI and the device.

TABLE 8

| | Prior Art ZigBee SEP 1.0 CBKE | Present Embodiments Secure ZigBee SEP 1.0 Inter-PAN |
| --- | --- | --- |
| Authentication | Mutual authentication | Sender authentication |
| Key Establishment | OOB Pre-Configured Link Key Process; CBKE | OOB Pre-Configured Link Key Process |
| Encryption | CCM*/AES-128 | CCM*/AES-128 |
| Security Layers | Network Layer security via a shared Network Key | n/a |
| | Application Layer Security via Application Link Keys: One Trust Center link key per ZigBee client Multiple application link keys between application pairs | Application Layer Security via Application Link Keys: One Pre-configured Link key per ZigBee client One Shared Link Key per UESI server |
| Key updates | Supported | Supported |
| Temporary Link key to secure initial Link key distribution | MMO of ZigBee client's Installation Code | MMO of ZigBee client's Installation Code |
| Key to secure subsequent key updates | Network Key + Trust Center Link Key | MMO of ZigBee client's Installation Code |

The process of establishing security keys uses the out-of-band (OOB) pre-configured Link Key process and is summarized as follows (see also FIG. 7). Initially, the HAN device is pre-commissioned. During the manufacturing process, a random Installation Code is created for each HAN device. This Installation Code is provided for the device (e.g., as a label on the packaging of the HAN device and/or configured into the device) to be referenced to during Commissioning and Registration of the HAN device to the UESI. The HAN device looks up the 'Pre-configured Link Key', or derives it using the MMO hashing function. During installation, the installer provides the Installation Code and MAC Address to the Utility's HES. These are then forwarded to the UESI, where they are stored. The UESI calculates the Pre-configured Link key as needed from the Installation Code and uses it to protect the distribution of the Shared Link Key to the associating HAN device. The Shared Link Key is in turn used to secure the distribution of network-wide application messages. Periodically, the UESI shall update the Shared Link Key by distributing a new one to registered HAN devices. All HAN devices receiving the key update (i.e., in the Commissioned state) will start using the new key immediately to process Application messages. Notice that this mechanism is also used to de-register HAN devices if needed, by only updating the key of the remaining registered HAN devices.

The registration process establishes an association between an Inter-PAN server (UESI) and an Inter-PAN client, i.e., HAN device. Registration messages are used to: Commission and Register a HAN device to the UESI; De-Register a HAN device from a UESI; and update network parameters on the HAN device. The Registration message is sent by the UESI to each registered device's MAC Address, on all the IEEE 802.15.4 channels. The Registration process distributes the Shared Link Key (used by the UESI to encrypt Application messages), the PAN ID, and the Channel Mask. The HAN device, upon reception of a Registration message, shall immediately update its PAN ID, Channel Mask, and the Shared Link Key contained in the Registration message to process subsequent Application messages.

Figure 6:
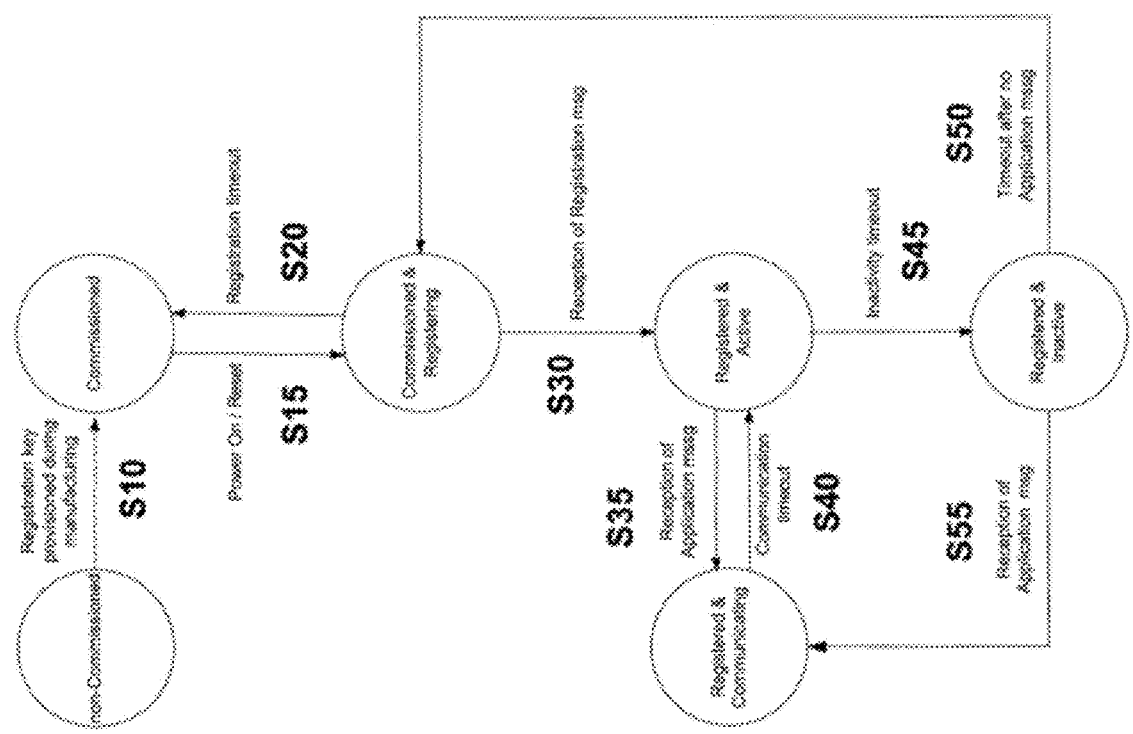
FIG. 6 illustrates process steps for client device from non-commissioned state to registered and active in accordance with various embodiments described herein.

FIG. 6 illustrates a state diagram showing the transitions between Commissioned and Registered states for an Inter-PAN client (see also FIG. 7). The triggers for state transition are described below: Power On/Reset—Initial transition after a power on or reset event S15; Registration timeout—upper limit to period of time without receiving a Registration message S20; Reception of a Registration message addressed to this client, and secured using its own pre-configured Link Key S30; Reception of Application message S35; Communication timeout—upper limit to period of time for which the Communicating indication is provided S40; Inactivity timeout—upper limit to short period of time without receiving an Application message S45; Application message timeout—upper limit to long period of time without receiving an Application message S50. Depending on its state, a client device can process either only Registration messages (in Commissioned state), or only Application messages (Registered state).

In an exemplary embodiment, Inter-PAN devices provide an indication of current state so that the end user of the device has an understanding of the state of the client device. For example, an LED indicator could be used during the Registration process to verify the status of the operation, and during the normal life of the device to verify the health of its communications. Table 9 provides exemplary indicator parameters.

TABLE 9

| State | Meaning | Exemplary LED indication | Explanation |
| --- | --- | --- | --- |
| Non-Commissioned | The device has not been Commissioned | n/a | A device cannot join the UESI until it is Commissioned with its pre-configured Link Key or Installation code. |
| Commissioned | The device has been Commissioned but is not Registering | n/a | The device needs to be triggered (e.g., powered-on) to start its Registration process |
| Commissioned and Registering | A device in the Commissioned state and listening for Registration messages | Slow (1000 ms) red LED or equivalent | Refer to the OOB registration process |
| Registered & Active | A device is in the Registered state and receiving messages | Medium (500 ms) green LED or equivalent | In OHP, a Registered device is by definition also Commissioned. |
| Registered & Communicating | A device is in the Registered state that is actively receiving a message | Fast (250 ms) green LED or equivalent | In OHP, a Registered device is by definition also Commissioned. |
| Registered & Inactive | A device is in the Registered state that is not receiving messages | Fast (250 ms) red LED or equivalent | This could indicate that e.g., the RF signal is weak, or that the device is de-registered |

Figure 7A:
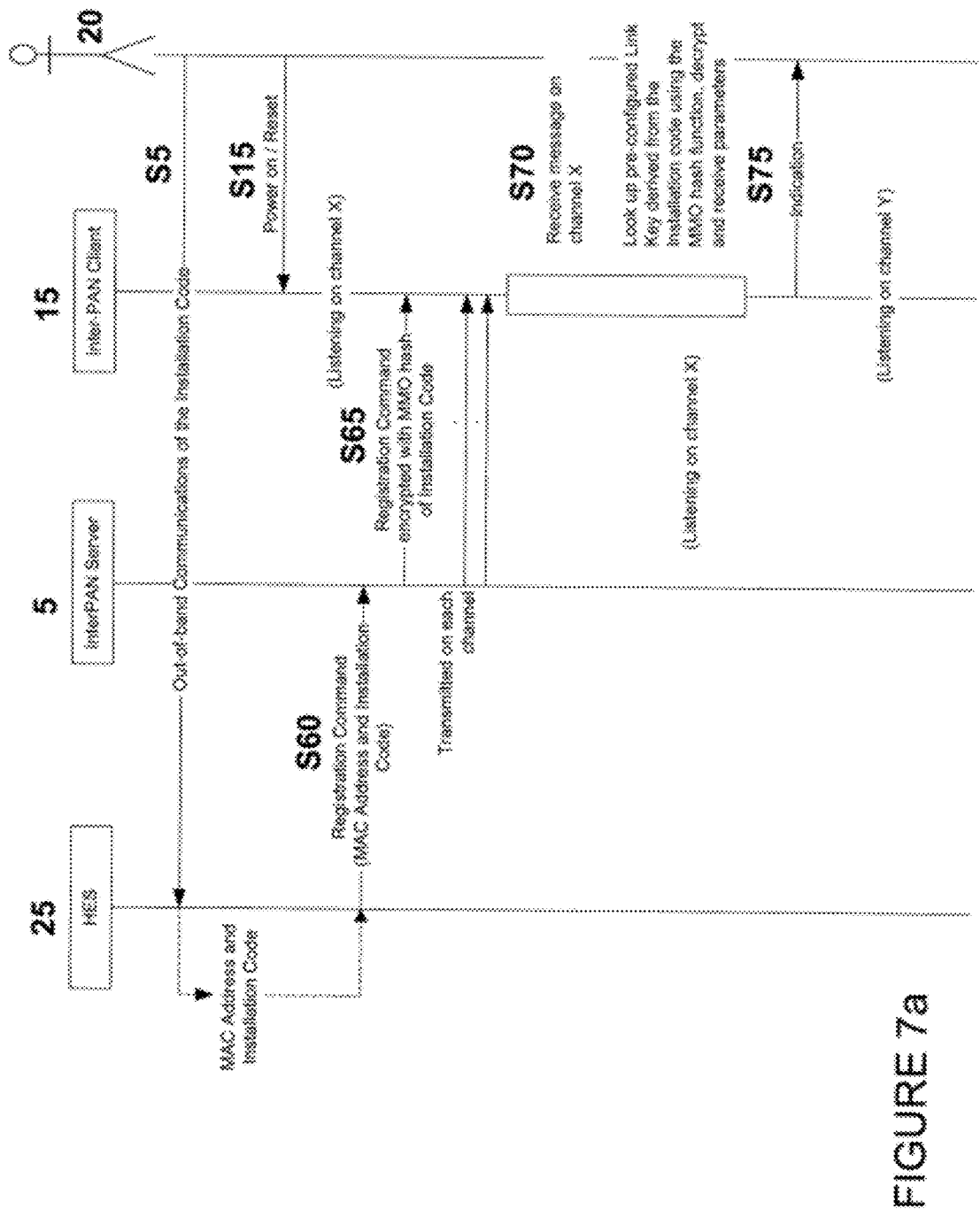
FIG. 7 is a schematic showing registration communication flow between various components and networks in accordance with various embodiments described herein.
Figure 7B:
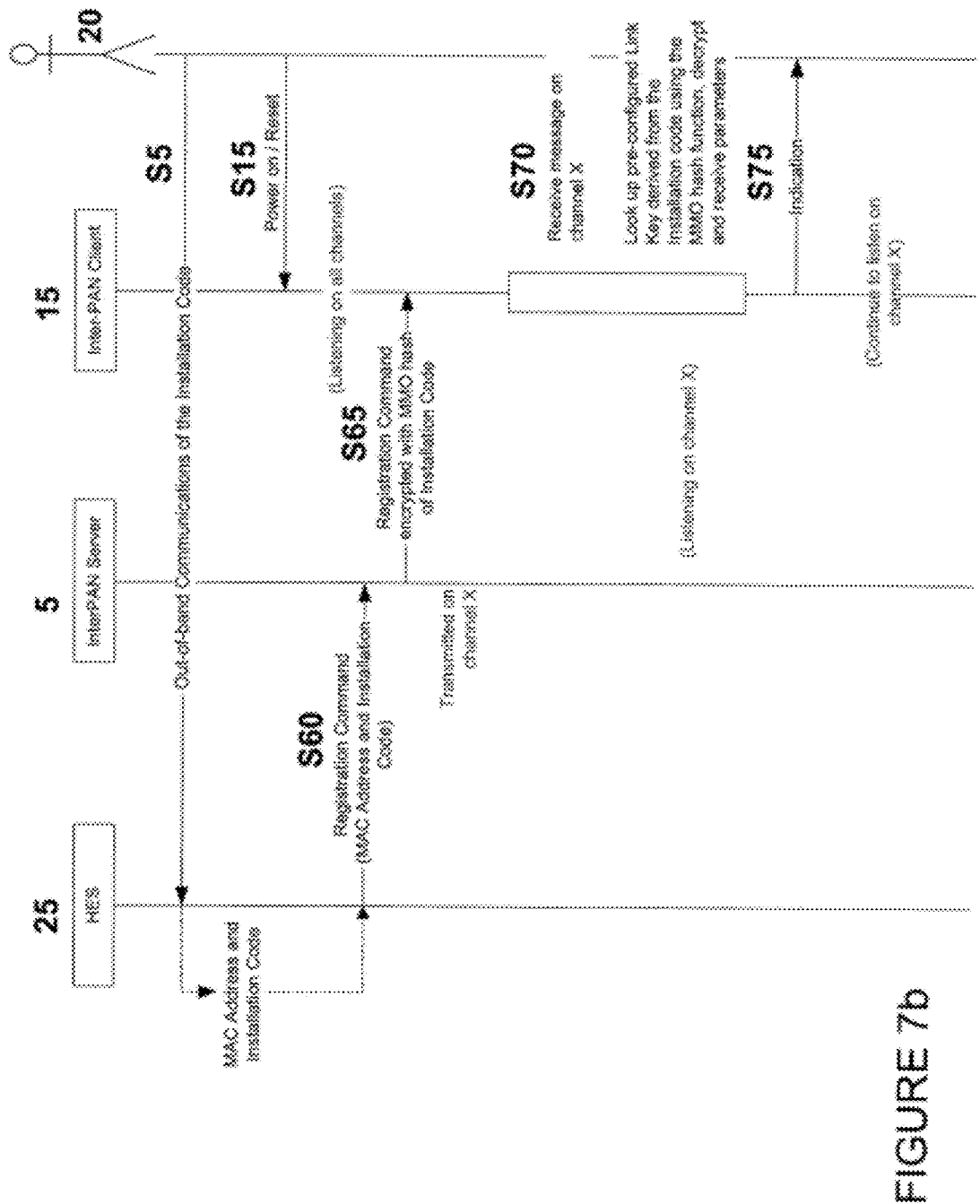

The initial registration message is authenticated using the device-specific encryption key derived from the installation code using the MMO hash function, as indicated by the Key Identifier field present at the data link, and is processed only by the owner of this key. This message flow is shown in FIG. 7a. The Registration process flow includes the following steps: the HAN device 15 automatically enters a state ready to accept Registration commands from the Inter-PAN server (i.e., UESI) 5 when it is first powered-on (e.g. the Installer 20 plugs in an Inter-PAN client, e.g., IHD, into the wall socket for the first time). The Installation Code and MAC Address are provided by OOB methods to the Utility HES 25, S5 (e.g. using an Internet consumer portal or a Call Center). The Installation Code is defined in section "5.4.8.1 Out of Band Pre-Configured Link Key Process" of the SEP Document. More specifically, during manufacturing, each client may provide a random Installation Code (unique per device for each vendor). This code is configured into the device, either as-is or through its MMO Hash, depending on the capabilities of the device, which will be required to (calculate and) use the MMO Hash to decrypt and authenticate registration messages directed to it as described herein. Additionally, the Installation Code is also provided, e.g., as a label on the packaging of each client device to facilitate the Registration process, where this code is presented out-of-band to the management tools that support provisioning it to the meter. The meter uses the stored Installation Codes to on-the-fly calculate the Pre-configured Link keys that are required to encrypt its Registration messages to specific clients.

The Utility HES first configures the Shared Link Key into the UESI (not shown). For each HAN device that is Registered, the Utility HES must also send the MAC Address and MMO Hash of the Installation Code to the UESI (not shown); alternatively the HES can send the Installation Code to the UESI where the MMO Hash is calculated S60. For each HAN device the UESI encrypts a Registration message using each client's MMO Hash, and then transmits it to the clients MAC Address and clients default PAN-ID, on all IEEE 802.15.4 channels S65. The Inter-PAN client locates the preconfigured link key that was pre-installed during manufacturing or calculates it via the MMO hash of its own Installation Code and uses that to decrypt the Registration message S70. Only the associated client that is able to authenticate and decrypt the received Registration message can receive the Shared Link key which is required to process Application messages.

Upon successful decryption of the Registration message, the Inter-PAN client immediately sets the PAN ID using the value specified in the Registration message. Pursuant to Table 9, an indicator may be set so that a user (e.g. homeowner or installer) knows that the device is registered S75. Then, the Inter-PAN client uses the Channel Mask field provided by the Inter-PAN server to select an available channel to receive its messages. This field represents a bitmap of channels that the server will broadcast SE Information messages on. The Inter-PAN client must use one of the enabled channels listed in the Channel Mask field. The Channel Mask field is a bit field of 15 bits where the least significant bit represents the channel 11. For example, if the Channel Mask value is represented in hexadecimal by the value Ox20D8 or in binary by the value 0010 0000 1101 1000, then the following channels are safe to listen on: 14, 15, 17, 18 and 24. Further to channel selection processes, in a particular embodiments, a UESI may have the ability to calculate the optimal Channel Mask field and PAN ID which will be provided to the Inter-PAN clients along with the Shared Link key to be used for Application messages. The optimal Channel Mask field excludes all channels which should not be used by the UESI's communications and thus indicates to the Inter-PAN clients which channels they should not listen on.

Since the one-way communication model does not allow for acknowledgement or confirmation of receipt of transmitted messages, if a listening device misses a message, the embodiments described herein do not provide a mechanism for the UESI to track the success of each transmission and resend messages as needed. As described herein, when a device is unable to hear Application messages for a preconfigured period, it times-out and returns to its Commissioned & Registering state, ready to accept Registration messages from the Inter-PAN server. Registration messages are periodically transmitted at intervals as configured in the UESI. With this mechanism in place, a client that misses an update is able to re-sync, simply by listening to the next available Registration message. Registration messages also include three parameters that inform the clients of message transmission periods set by the server: Publish Price Message Period, Energy Usage Message Period, and Registration Message Period. These parameters can be used by a client for optimization purposes, e.g., a sleepy client can be programmed to synchronize its wake times with these periods.

Alternatively, in a specific implementation, UESI supports a configurable time period parameter for Registration messages, wherein a user at the HES can modify the broadcast time period parameter of the UESI, and then use the AMI network to send the update to the UESI. Further still, an on-demand feature may be provided through the HES to invoke an asynchronous Registration message. The HES user interface supports a button for each registered device to immediately invoke a Registration message to that device. This is in addition to the configurable periodic broadcast of the Registration messages. This on-demand feature is integrated to facilitate installation and troubleshooting of a device.

Figure 8:
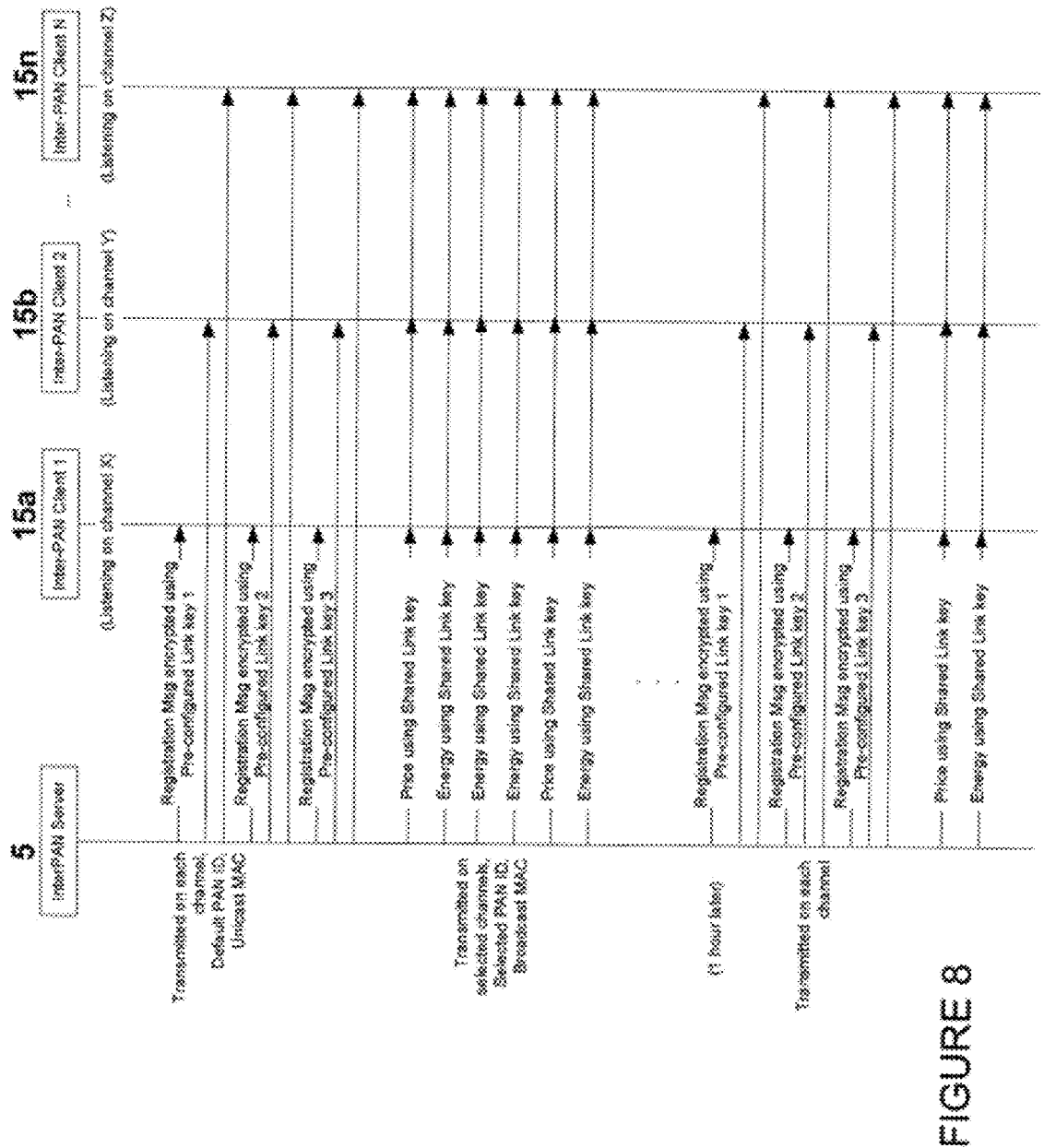
FIG. 8 is a schematic showing registration and application message flow between various components and networks in accordance with various embodiments described herein.

FIG. 8 illustrates the repetitive, point-to-multipoint nature of the transmission of Registration messages in accordance with certain embodiments described herein. As shown, the Inter-PAN server 10 transmits N individual registration messages encrypted using device PLKs (MMO hash of each Installation Code), e.g., PLK1, PLK2, ... PLKN at a first time on channels X, Y, Z. Each of the individual Inter-PAN devices (15a, 15b, ... 15n) is listening on a Channel X, Y, Z. Pursuant to a pre-established iterative period set, the Inter-PAN server, i.e., UESI 10, repeats this transmission every 60 minutes (1 hour). The Registration messages facilitate transmission of changes to the RF Channels and PAN ID as they may need to be changed; the Shared Link Key remains the same.

Periodic repetition of registration messages works to avoid the need for out-of-band re-registration, should a device miss a critical update. Per FIG. 8, messages are transmitted on all channels, repeated over a preconfigured interval for each registered node, and secured via their respective pre-configured Link keys (i.e., MMO hash of pre-configured Installation codes). Whenever re-registration is required, the UESI will immediately send the new Registration messages, thereby restarting the inter-message intervals, repeating the new values until new changes are needed. From a device perspective, whenever it gets out of sync with these parameters, it times out and waits for the next Registration message protected with its own encryption key derived from the Installation code using MMO hash function. In order to de-register a device, the server does the following: sends a Registration message with Shared Link key=0x0000 (all zeros) to that device, causing it to reset its registration state (optional step); sends an updated Shared Link key to the remaining clients; removes the pre-configured Link key of the de-registered client from its registration table.

Once registered, a client device is capable of receiving smart energy (SE) Application messages transmitted from the UESI on selected channels. A registered client device shall receive all SE Application messages, i.e., there is no selective registration required for published pricing or energy usage messages. Upon receiving an SE Application message, the client device will read the Destination MAC (D-MAC) Address. If the D-MAC Address is the client device's own MAC Address, the client device shall process the message with the devices PLK. If the D-MAC Address is the broadcast short MAC Address, the client device shall process the message with the SLK.

Using the systems and processes described herein, the UESI may send at least the following infoimation to all Inter-PAN clients: Electricity price using the Publish Price Command in the Price Cluster and Energy usage using the Simple Metering Cluster server attributes.

Figure 9:
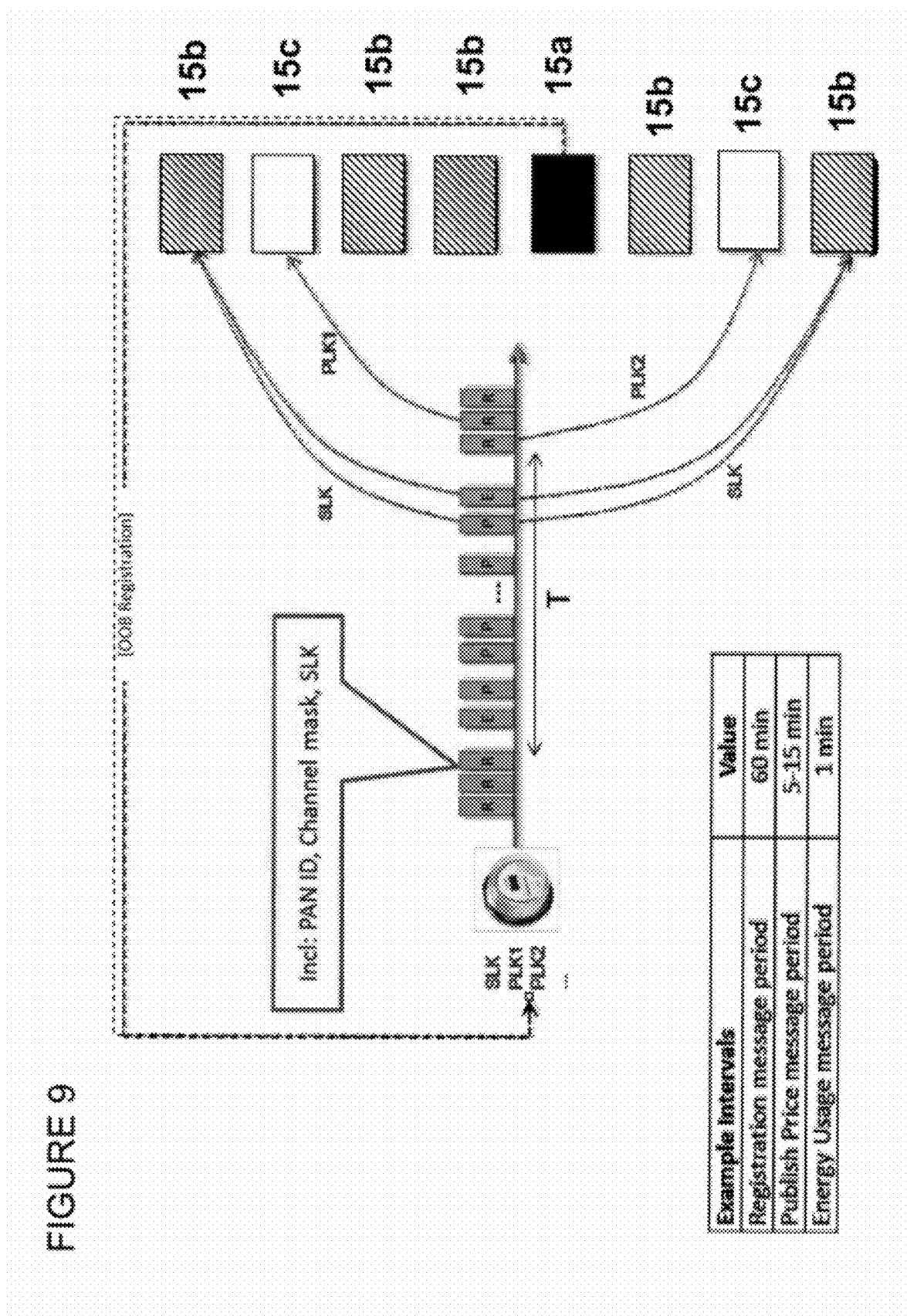
FIG. 9 is an alternative schematic illustrating message flow and timing intervals in accordance with a secure one-way registration process.

Referring to FIG. 9, the registration and subsequent communication processes and intervals pursuant to an exemplary embodiment wherein the UESI 10 is part of the utility meter as shown. In this example, target device (Inter-PAN devices) 15*a* is not yet available to receive registration messages, target devices 15*b* are available to receive registration messages (R) and target devices 15*c* are registered and available to receive published price (P) and energy (E) application messages. The time (T) is indicated and an exemplary table of time intervals is also shown representing the interval between clusters of Registration messages.

In an alternative approach to support a registration, the UESI sends the registration messages on a single, e.g., channel X (or a few) channel(s) as compared to all, and the registering clients scan all or a subset of channels for registration messages sent to their own MAC addresses. Once a client finds such a registration message it retrieves the SLK and Channel mask, and the process proceeds as described. A benefit of this approach is that is can significantly reduce the traffic associated with registration messages (e.g., down to 1/16) that are periodically repeated. (See FIG. 7*b*).

Further still, in another alternative embodiment, all communications (i.e., both registration and application messages) are supported on the same channel and the channel mask is not needed. When a UESI needs to change channels, the UESI starts using the new channel. The clients eventually time out when they stop receiving messages on the original channel and start scanning again, hunting for their registration messages. (See FIG. 7*b*).

Figure 10:
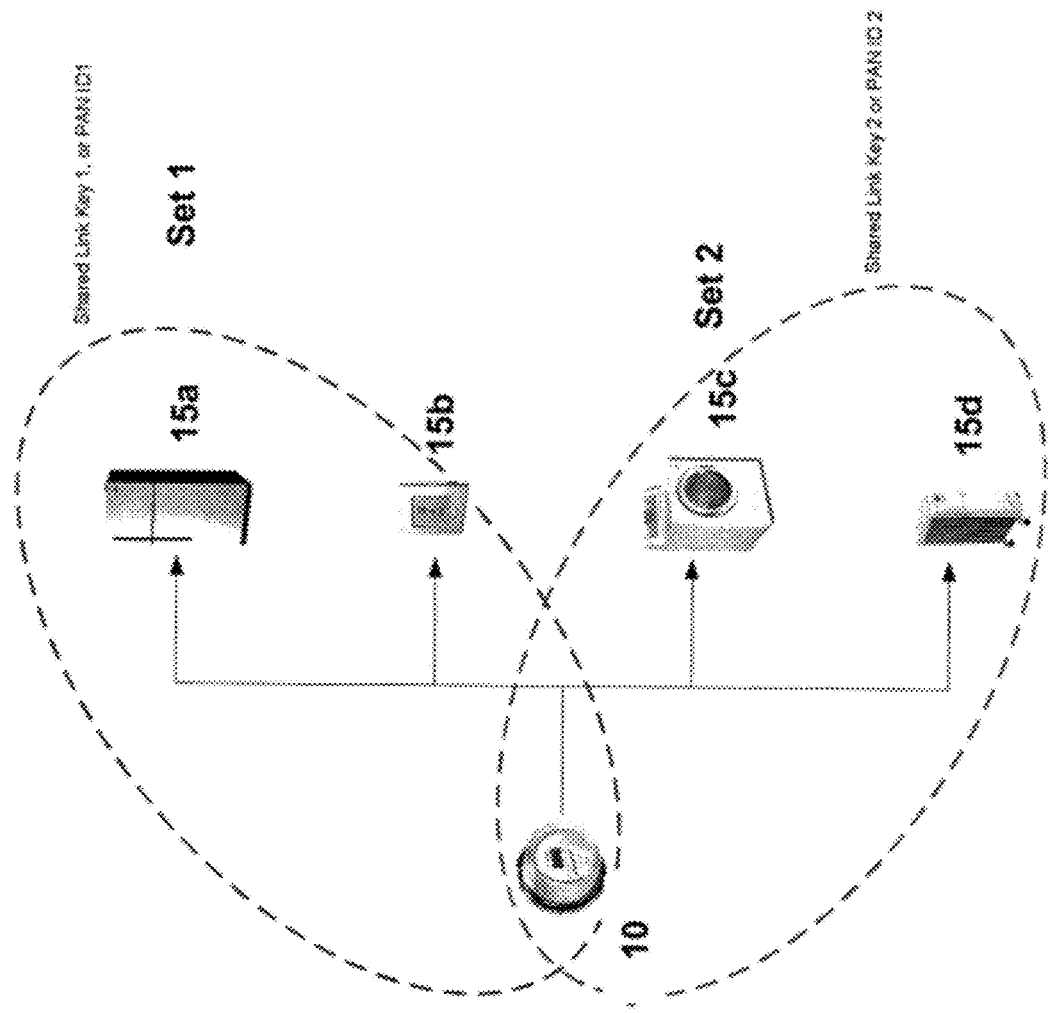
FIG. 10 is a schematic showing overlapping sub-domains with a HAN for receiving messages in accordance with a secure one-way registration process.

While descriptions above detail a process for distributing a single SLK, in an alternative embodiment, multiple SLKs could be used to extend to multiple groups of target devices to confidentially send different smart energy information to devices within a premise. For example, referring to FIG. 10, two sets of target devices on a single HAN can be addressed individually and receive different sets of energy information by the UESI 10 in accordance with different SLKs and/or different PAN IDs. In this example, SET 1 includes the refrigerator 15*a* and theimostat 15*b* and is established for energy data push from the UESI 10 using either SLK1 or PAN IDI, whereas SET 2 includes the wash machine 15*c* and server 15*d* and is established for energy data push from the UESI 10 using either SLK2 or PAN ID2.

Referring to FIG. 1*c*, an alternative embodiment to the one-way communication system describer with respect to the FIG. 1*b* is shown. In FIG. 1*b*, the UESI 10 provides secure smart energy information to a registered target device 15, indirectly via an intermediate energy information server IEIS 12 (e.g., a full function HAN device). The UESI 10 communicates with the IEIS 12 via a secure two-way HAN and provisions it to communicate with the target device 15 on its behalf. Using two-way secure Inter-PAN, the HAN device requests data from a meter by first contacting the meter via a beacon request. Once it locates the meter, it then requests data via an Inter-PAN message, which is then provided by the meter in response. The benefit of this architecture is that it provides extended coverage via the HAN, as Inter-PAN is limited to a single hop. The IEIS 12 thus extends the reach of the UESI 10 and provides a secure way of distributing smart energy information to one-way target devices.

Figure 1D:
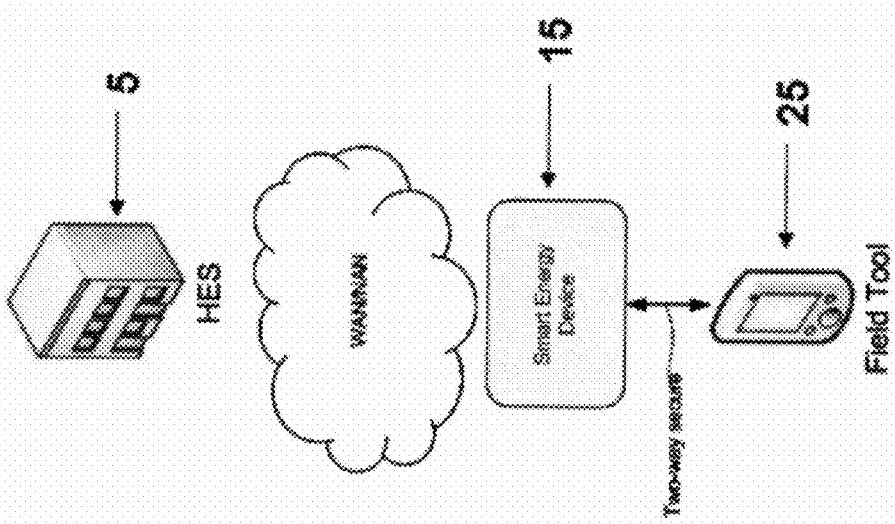

The embodiments described to this point have generally been directed to one-way secure communications or combinations of one-way and two-way secure communications. FIGS. 1*d* and 1*e* illustrate systems wherein secure two-way communications are implemented. More particularly, as shown in FIG. 1*d*, a smart energy device 15, e.g., IHD or meter, communicates wirelessly with a field tool using secure two-way Inter-PAN, e.g., ZigBee. In this configuration, the Field Tool 25 is able to ascertain information from the smart energy device 15 to determine the need for and initiate operation, maintenance and configuration interactions as needed.

Referring to FIG. 1*e*, the underlying communications from Field Tool 25 to an UESI 10 are two-way secured Inter-PAN, but the data flow from the UESI 10 to the HAN device 15 is one-way. The field tool first establishes a secure two-way Inter-PAN connection with the UESI which serves as a proxy, and in turn establishes a secure connection with the Smart Energy device via standard ZigBee security procedures.

The ability to add a Field Tool in an ad hoc fashion using the processes described herein avoids the requirement that the Field Tool actually join the HAN in order to communicate with a target device. This process can be expanded to other ad hoc device such as smart phones which can use the processes to communicate with the target devices.

Figure 11:
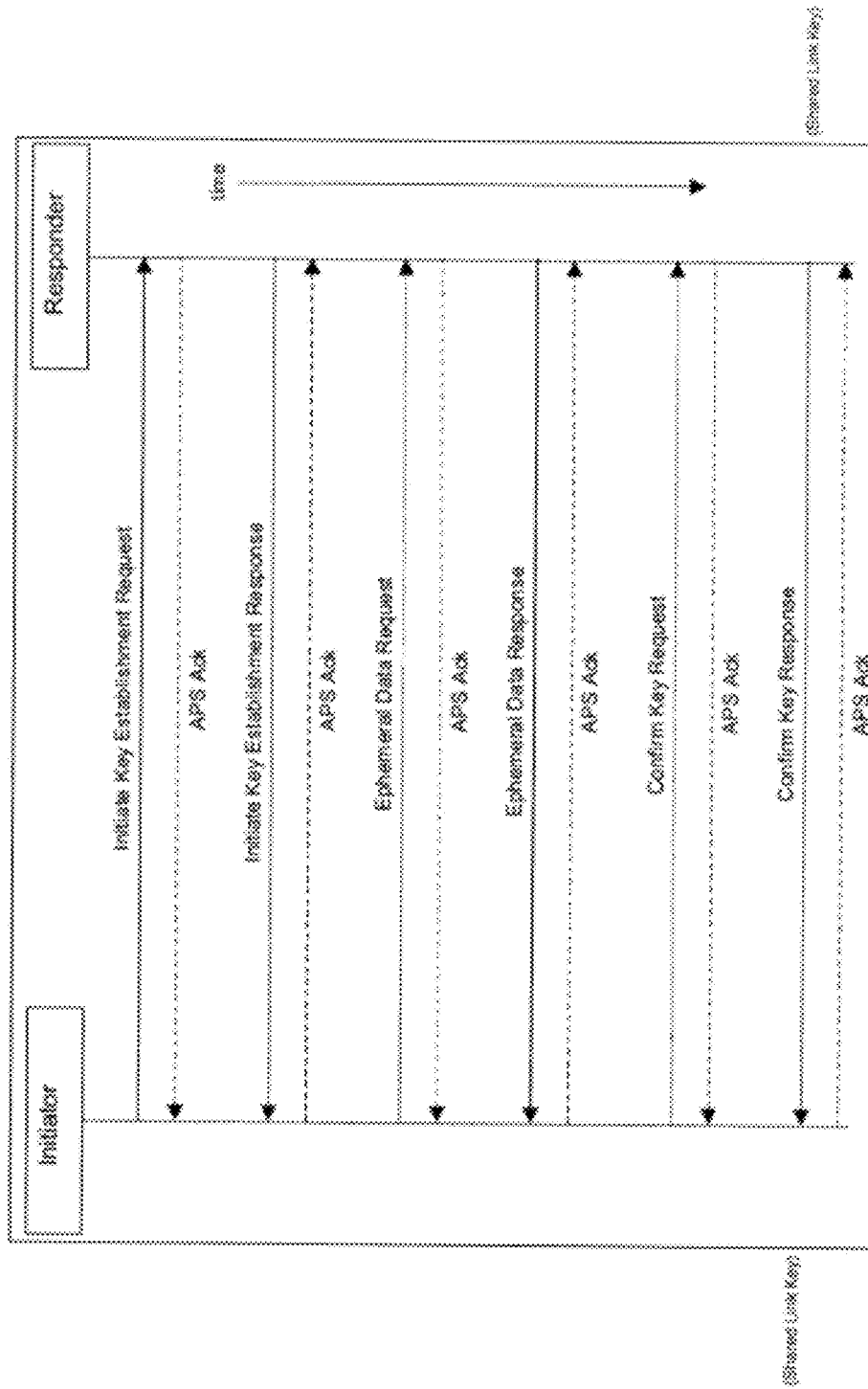
FIG. 11 is a prior art exemplary message flow for SLK establishment in accordance with two-way Inter-PAN process.

In accordance with the embodiments described above, there are both one-way and two-way processes for securing Inter-PAN communications. While these processes have underlying similarities, there are differences. The steps of the one-way process are generally outlined in FIG. 4*a* which is described above. The steps of the two-way process are generally outlined in FIG. 4*b*. In both scenarios, there is an authentication phase followed by a phase where both parties arrive at an SLK, which is then used to encrypt communications during the authorized session, and is valid until it times out. More particularly, for two-way Inter-PAN, mutual authentication is achieved via the Certificate Based Key Exchange (CBKE) S105 process as described in the SEP Document incorporated herein by reference. After mutual authentication and exchange of ephemeral data, both parties derive a shared link key S110, the server verifies the client's MAC address versus a trusted list S115 and the SLK is used by both client and server to encrypt each message S120. A prior art CBKE flow is illustrated in FIG. 11.

As shown in FIGS. 1*b*-1*e*, the secure Inter-PAN communications are utilized as part of a larger system. Referring to FIG. 12, in a specific example, the UESI 10 is hosted on an existing meter 30 at a customer location which communicates with the HES 5 through the NAN. This infrastructure enables secure over-the-air remote registration and key management via the HES, as well as locally from the field using radio-enabled communications with the meter (e.g., via USB adapter connected to field operator laptop 20). More specifically, the HES supports a Web Services API to accept Installation Codes and MAC Addresses, one pair for each target client's registration (multiple per meter). The Installation Codes and MAC Addresses are stored at the HES and configured in the meters which use these to on-the-fly calculate the individual Pre-configured Link Keys to encrypt Inter-PAN Registration messages and forward them to targets using their individual MAC Addresses. The HES allows for the generation, storage, and distribution of SLKs (generally one per meter, but multiple possible in accordance with FIG. 10). Keys are distributed over-the-air via the NAN. Additionally, the field computer 20 also supports the capability to accept an entered Installation Code and MAC Address and write it to the meter. Such configurations are synchronized with the HES, when it is part of the deployment.

The present embodiments support as an application message, the Publish Price message in the SEP Documents incorporated herein by reference. Table 10 is an exemplary application message format for Publish Price messages. Fields are listed in their order of transmission; the first field listed is transmitted first. All multi-bytes fields are encoded Least Significant Byte first (LSB).

TABLE 10

| Fields name | Data type | Description and value |
|---|---|---|
| ZigBee APS Header | | |
| APS frame control | 1 byte | |
| Frame type | Bits 0 to 1 | Inter-PAN (11) |
| Delivery Mode | Bits 2 to 3 | Unicast (00) |
| Security | Bit 5 | True (1) |
| ACK request | Bit 6 | False (0) |
| Extended Header Present | Bit 7 | False (0) |
| Cluster identifier | 2 bytes | Price (0x0700) |
| Profile identifier | 2 bytes | ZigBee Smart Energy (0x0109) |
| Auxiliary Header | | |
| Security control | | |
| Security level | Bits 0 to 2 | ENC-MIC-32 (101) |
| Key identifier | Bits 3 to 4 | A data key(00) |
| Extended nonce | Bit 5 | (0) |
| Frame counter | 4 bytes | |
| ZCL header | | |
| Frame control | 1 byte | |
| Frame type | Bits 0 to 1 | Command is specific to a cluster (01) |
| Manufacturer specific | Bit 2 | False(0) |
| Direction | Bit 3 | From the server(1) |
| Disable default response | Bit 4 | True(1) |
| Transaction sequence number | 1 byte | Unique ID generated by the Inter-PAN server |
| Command identifier | 1 byte | Identify (0x00) |
| ZCL payload | | |
| Provider ID | Unsigned 32 bit Integer | |
| Rate Label | Octet String | |
| Issuer Event ID | Unsigned 32 bit Integer | |
| Current Time | UTC Time | |
| Unit of Measure | 8 bits enumeration | |
| Currency | Unsigned 16 bit Integer | |
| | 8 bit BitMap | |
| Price Trailing Digit | | |
| Price Tier | | |
| | 8 bit BitMap | |
| Number of Price Tiers | | |
| Register Tier | | |
| Start Time | UTC Time | |
| Duration In Minutes | Unsigned 16 bit Integer | |
| Price | Unsigned 32 bit Integer | |
| Price Ratio | Unsigned 8 bit Integer | |
| Generation Price | Unsigned 32 bit Integer | |
| Generation Price Ratio | Unsigned 8 bit Integer | |
| Alternate Cost Delivered | Unsigned 32 bit Integer | |
| Alternate Cost Unit | 8 bits enumeration | |
| Alternate Cost Trailing Digit | 8 bit BitMap | |

The UESI supports time-of-use (TOU) rates and critical peak pricing events (CPP). It may receive information for Publish Price messages from the Utility HES, or possibly generate the messages using locally configured parameters. The UESI transmits price messages per the ZigBee Smart Energy Profile guidelines for the Publish Price Command when an update to the pricing information is available from the commodity (e.g., gas, electricity, water) provider. The UESI transmits price messages in pairs: the current price and then the next price. In the case of the Publish Price message related to the current price, the fields CURRENT TIME and START TIME are identical. In the case of the Publish Price message related to the next price, the field CURRENT TIME will be before the field START TIME. The UESI meter may have a real-time clock and use the UTC time shared across the AMI network to populate the field CURRENT TIME of the Publish Price message. The UTC time shared across the AMI network is provided by an NTP server via the HES. It is possible for HAN devices to approximately synchronize time with the UESI meter using the CURRENT TIME message field. The UESI transmits the price message as a broadcast addressed message on the IEEE 802.15.4 channels specified in the Channel Mask field (see FIG. 8).

Since this UESI is based on a one-way model, there is a probability that a listening client may occasionally not successfully receive the price messages (since there is no mechanism to request retransmissions). Missing a Publish Price message update could potentially let a device use out of date price information for long periods of time. The UESI may therefore optionally transmit Publish Price messages periodically between changes in the price from when an update to the pricing information is available from the commodity provider. With this mechanism in place, a client that misses an update is able to re-synchronize, simply by listening to the subsequent periodic price message transmissions. As discussed above, in a specific implementation, the UESI supports a configurable time period parameter for price messages. The HES user interface allows the utility operator to modify the broadcast time period parameter of the UESI meter, and then use the AMI network to send the update to the UESI meter. The default time period parameter may be predetermined, e.g., 10 minutes.

The embodiments described herein assume that the HAN devices are able to manage Publish Price messages. In addition to requirements set forth in the SEP Document which is incorporated herein by reference, the embodiments require the HAN devices handle two instances of Publish Price messages. As described above, the first instance is related to current price and the second instance is related to next price. This approach gives more robustness to the system in the case the HAN device is missing a price update. In that case, the client must apply the next price at the appropriated time. Additionally, as described, the Publish Price message related to current price can be used to perform time synchronization, the HAN device needs to be able to handle the UTC to local time conversion.

The systems and processes described herein depict a mechanism for providing utility usage information. An exemplary message format for a meter cluster application message prepared by the UESI for an Inter-PAN device is illustrated in Table 11.

TABLE 11

| Fields name | Data type | Description and value |
|---|---|---|
| ZigBee APS Header | | |
| APS frame control | 1 byte | |
| Frame type | Bits 0 to 1 | Inter-PAN (11) |
| Delivery Mode | Bits 2 to 3 | Unicast (00) |
| Security | Bit 5 | True (1) |
| ACK request | Bit 6 | False (0) |
| Extended Header Present | Bit 7 | False (0) |

TABLE 11-continued

| Fields name | Data type | Description and value |
|---|---|---|
| Cluster identifier | 2 bytes | Simple Metering (0x0702) |
| Profile identifier | 2 bytes | ZigBee Smart Energy (0x0109) |
| Auxiliary Header | | |
| Security control | | |
| Security level | Bits 0 to 2 | ENC-MIC-32 (101) |
| Key identifier | Bits 3 to 4 | A data key(00) |
| Extended nonce | Bit 5 | (0) |
| Frame counter | 4 bytes | |
| ZCL header | | |
| Frame control | 1 byte | |
| Frame type | Bits 0 to 1 | Command acts across the entire profile (00) |
| Manufacturer specific | Bit 2 | False(0) |
| Direction | Bit 3 | From the server(1) |
| Disable default response | Bit 4 | True(1) |
| Transaction sequence number | 1 byte | Unique ID generated by the Inter-PAN server |
| Command identifier | 1 byte | Report attributes (0x0a) |
| ZCL payload | | |
| CurrentSummationDelivered | | |
| Attribute identifier | 2 bytes | 0x0000 |
| Attribute data type | 1 byte | Unsigned 48 bit Integer (0x25) |
| Attribute data | 6 bytes | |
| InstantaneousDemand | | |
| Attribute identifier | 2 bytes | 0x0400 |
| Attribute data type | 1 byte | Signed 24 bit Integer (0x2A) |
| Attribute data | 3 bytes | |
| CurrentDayConsumptionDelivered | | |
| Attribute identifier | 2 bytes | 0x0401 |
| Attribute data type | 1 byte | Unsigned 24 bit Integer (0x22) |
| Attribute data | 3 bytes | |
| PreviousDayConsumptionDelivered | | |
| Attribute identifier | 2 bytes | 0x0403 |
| Attribute data type | 1 byte | Unsigned 24 bit Integer (0x22) |
| Attribute data | 3 bytes | |
| UnitofMeasure | | |
| Attribute identifier | 2 bytes | 0x0300 |
| Attribute data type | 1 byte | 8-bit Enumeration (0x30) |
| Attribute data | 1 byte | |
| Multiplier | | |
| Attribute identifier | 2 bytes | 0x0301 |
| Attribute data type | 1 byte | Unsigned 24 bit Integer (0x22) |
| Attribute data | 3 bytes | |
| Divisor | | |
| Attribute identifier | 2 bytes | 0x0302 |
| Attribute data type | 1 byte | Unsigned 24 bit Integer (0x22) |
| Attribute data | 3 bytes | |
| SummationFormatting | | |
| Attribute identifier | 2 bytes | 0x0303 |
| Attribute data type | 1 byte | 8 bit BitMap (0x18) |
| Attribute data | 1 byte | |
| DemandFormatting | | |
| Attribute identifier | 2 bytes | 0x0304 |
| Attribute data type | 1 byte | 8 bit BitMap (0x18) |
| Attribute data | 1 byte | |
| HistoricalConsumptionFormatting | | |
| Attribute identifier | 2 bytes | 0x0305 |
| Attribute data type | 1 byte | 8 bit BitMap (0x18) |
| Attribute data | 1 byte | |

The UESI uses the local meter data to generate the energy usage message. The UESI follows the Simple Metering server cluster guidelines as set forth in the SEP Document which is incorporated herein by reference. The UESI periodically transmits the energy usage message. A UESI may support a configurable time period. Once the end of the time period is met, the UESI generates and transmits an energy usage message, e.g., every 60 seconds. The UESI transmits the energy usage message as a broadcast addressed message on the IEEE 802.15.4 channels specified in the Channel Mask field.

The systems and methods described herein support "silent" joining via a commissioning or pre-provisioned method. All data required to enter the network is already provided to the node, i.e., client device, so that no joining procedure itself is required. A client device thus creates its own network and joins it. The client can enter the commissioning & registering state by using the silent join mode with default network and security parameters, and join the network as a router device. By way of example, the relevant default values are shown in Table 12 below:

TABLE 12

| Parameter | Value | Comment |
|---|---|---|
| Startup Control | 0x00 | 0x00 means that the node will 'silently join' with the commissioned settings |
| PAN ID | CRC16 of its own MAC Address | This value will be overwritten based on the PAN ID received in the Registration message |
| Channel | Randomly selected by the application | This value may be overwritten based on the Channel mask received in the Registration message |
| Pre-configured Link key | MMO Hash of the configured Installation Code | |

The client then listens for a Registration message on the selected channel that is (1) sent to its own MAC address and default PAN ID, and (2) can be successfully processed with its own Pre-configured Link key. When it successfully decrypts this message, the client saves the server's MAC Address, and updates the PAN ID, channel mask, and Shared Link key, accordingly. At this point the client is capable of receiving and decrypting application messages.

Notice that if two clients end up on the same channel (with the same PAN ID), even though a PAN ID conflict is detected, it is not resolved because clients are not Coordinators and only the Coordinator (which is the Network Manager as well) can change the PAN ID of the network. (The client device will attempt to send a conflict report to the Coordinator, but because there is no Coordinator node nothing happens). Accordingly, multiple clients can co-exist on the same channel with the same PAN ID.

The embodiments described herein are intended to be exemplary. One skilled in the art will recognize variations thereof that are clearly with the scope of the embodiments described.

The invention claimed is:

1. A communications module for facilitating secure communications on a first network and a second network comprising:
a single transceiver having a two-way communication channel to the first network for receiving and transmitting first network messages from and to the first network and only a one-way communication channel to the second network for only transmitting second network messages to the second network;
at least a first processor connected to the single transceiver for processing one or more first network messages and second network messages;
the at least a first processor including first network logic for processing first network messages and second network logic for processing second network messages; and
the second network logic including instructions for securing second network messages such that decryption of the second network messages is limited to a particular receiving device on the second network,
wherein the second network logic also includes instructions received by the single transceiver from one or more first network messages that indicate a set of one-way communication channels on which the single transceiver is to transmit the second network messages and which include information that is unique to the particular receiving device, and wherein the second network messages include two types of messages, registration messages and application messages.

2. The communications module of claim 1, further comprising a second processor connected to the single transceiver, wherein the first network logic is included on the first processor and the second network logic is included on the second processor.

3. The communications module of claim 1, wherein the information that is unique to the particular receiving device is generated based on identification data from the particular receiving device that is transmitted and received by a head end system location outside of both the first network and the second network.

4. The communications module of claim 1, wherein each registration message transmitted by the single transceiver on the second network is encrypted with a pre-configured key based on the information that is unique to a particular receiving device and is unicast by the single transceiver on the set of one-way communication channels.

5. The communications module of claim 4, wherein when the particular receiving device decrypts a registration message, it reads a shared link key.

6. The communications module of claim 5, wherein each application message transmitted by the single transceiver on the second network is encrypted with the shared link key and is broadcast by the single transceiver to a subset of the set of one-way communication channels.

7. The communications module of claim 1, wherein the first network is a wide area network and the second network is a home area network, the home area network being unique to a consumer.

8. A process for registering a device located on a home area network with a communications module having only a one-way communication channel to the device and a two-way communication channel to a head end system that is not on the home area network, to facilitate receipt at the device of messages from the communications module that originated outside of the home area network comprising:
receiving a device registration key that is unique to the device at the head end system;
receiving at the communications module via the two-way communication channel the device registration key from the head end system;
transmitting by the communications module a registration message encrypted with a version of the device registration key on multiple one-way communication channels;
listening by the device for registration messages on a particular one-way communication channel within the multiple one-way communication channels; and
upon receiving on the particular one-way communication channel the registration message encrypted with the device's registration key, decrypting the registration message to retrieve a shared link key for decrypting application messages from the communications module.

9. The process of claim 8, wherein the application messages contain at least one of utility consumption information that is specific to one or more consumers associated with the home area network, utility pricing information that is specific to one or more consumers associated with the home area network, and text messages from a utility provider to one or more consumers associated with the home area network.

10. The process of claim 9, wherein the communications module transmits the application messages at predetermined time intervals.

11. The process of claim 8, wherein the device registration key is an installation code that is physically and/or electronically associated with the device during manufacture thereof.

12. The process of claim 11, wherein the version of the device registration key is an MMO hash of the installation code.

13. The process of claim 8, wherein the communications module also receives MAC address information for the device from the head end system.

14. The process of claim 8, wherein the communications module transmits the registration message encrypted with a version of the device registration key on multiple one-way communication channels at predetermined time intervals.

15. A process for registering multiple devices located on a home area network with a communications module having only a one-way communication channel to the device and a two-way communication channel to a head end system that is not on the home area network, to facilitate receipt at the multiple devices of messages from the communications module that originated outside of the home area network comprising:
receiving a unique device registration key for each of the multiple devices at the head end system;
receiving at the communications module via the two-way communication channel each of the unique device registration keys from the head end system;
transmitting by the communications module on multiple one-way communication channels individual registration messages each encrypted with a version of one the multiple device registration keys;
listening by each of the multiple devices for registration messages on a particular one-way communication channel within the multiple one-way communication channels;
upon receiving on the particular one-way communication channel the registration message encrypted with an individual of the multiple device's registration key, decrypting the registration message to retrieve one of a first or second shared link key for decrypting application messages encrypted with one of the first or second shared link keys from the communications module;

wherein each of the multiple devices on the home area network receives either the first or the second shared link key, but not both.

16. The process of claim 15, wherein the application messages contain at least one of utility consumption information that is specific to one or more consumers associated with the home area network, utility pricing information that is specific to one or more consumers associated with the home area network, and text messages from a utility provider to one or more consumers associated with the home area network.

17. The process of claim 16, wherein the communications module transmits the application messages at predetermined time intervals.

18. The process of claim 15, wherein the unique device registration keys are installation codes that are physically and/or electronically associated with the devices during manufacture thereof.

19. The process of claim 18, wherein the version of the device registration key is an MMO hash of the installation code.

20. The process of claim 15, wherein the communications module also receives MAC address information for the each of the multiple devices from the head end system.

21. The process of claim 15, wherein the communications module transmits the registration messages encrypted with a version of the unique device registration keys on multiple one-way communication channels at predetermined time intervals.

* * * * *